United States Patent
Ikeuchi et al.

(10) Patent No.: US 12,391,798 B2
(45) Date of Patent: Aug. 19, 2025

(54) FLUOROPOLYETHER GROUP-CONTAINING SILANE COMPOUND

(71) Applicant: DAIKIN INDUSTRIES, LTD., Osaka (JP)

(72) Inventors: Hideyuki Ikeuchi, Osaka (JP); Masato Naitou, Osaka (JP); Motoshi Matsui, Osaka (JP); Takashi Nomura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 838 days.

(21) Appl. No.: 17/647,057

(22) Filed: Jan. 5, 2022

(65) Prior Publication Data
US 2022/0127418 A1    Apr. 28, 2022

Related U.S. Application Data

(63) Continuation of application No. PCT/JP2020/034141, filed on Sep. 9, 2020.

(30) Foreign Application Priority Data

Sep. 26, 2019 (JP) .................. 2019-176062

(51) Int. Cl.
 C08G 65/336  (2006.01)
 C08G 65/333  (2006.01)
 C07F 7/08    (2006.01)
 C07F 7/18    (2006.01)
 C09D 5/16    (2006.01)

(52) U.S. Cl.
 CPC ......... *C08G 65/336* (2013.01); *C08G 65/333* (2013.01); *C07F 7/081* (2013.01); *C07F 7/1804* (2013.01); *C07F 7/188* (2013.01); *C09D 5/1625* (2013.01)

(58) Field of Classification Search
 CPC ...... C09D 5/1625; C07F 7/081; C07F 7/1804; C07F 7/188; C08G 65/336; C08G 65/333
 See application file for complete search history.

(56) References Cited

U.S. PATENT DOCUMENTS

| | | | |
|---|---|---|---|
| 10,563,070 B2* | 2/2020 | Mitsuhashi | .......... C08G 65/007 |
| 2015/0307719 A1 | 10/2015 | Mitsuhashi et al. | |
| 2019/0002635 A1 | 1/2019 | Mitsuhashi et al. | |
| 2019/0390009 A1 | 12/2019 | Mitsuhashi et al. | |
| 2020/0095433 A1 | 3/2020 | Mitsuhashi et al. | |

FOREIGN PATENT DOCUMENTS

| | | | |
|---|---|---|---|
| JP | 2004-264384 A | 9/2004 | |
| JP | 2014-112192 A | 6/2014 | |
| JP | 2014-218639 A | 11/2014 | |
| JP | 2016-157100 A | 9/2016 | |
| JP | 2017-082194 A | 5/2017 | |
| JP | 2017-137271 A | 8/2017 | |
| JP | 2018203978 | * 6/2018 | |

OTHER PUBLICATIONS

International Preliminary Report on Patentability dated Mar. 15, 2022 with a Translation of the Written Opinion of the International Searching Authority in Application No. PCT/JP2020/034141.
Extended European Search Report dated Oct. 31, 2023, issued in European Application No. 20870310.8.
F.B. Madsen, et al., "Visualisation and characterisation of heterogeneous bimodal PDMS networks", Royal Society of Chemistry, 2014, URL, https://pubs.rsc.org/en/content/articlehtml/2014/ra/c3ra47522k, pp. 6939-6945, vol. 4.
International Search Report for PCT/JP2020/034141 dated Nov. 24, 2020 (PCT/ISA/210).

* cited by examiner

*Primary Examiner* — Gregory Listvoyb
(74) *Attorney, Agent, or Firm* — Sughrue Mion, PLLC

(57) ABSTRACT

A fluoropolyether group-containing silane compound of the formula (1a) or the formula (1b), the symbols of which are as defined herein:

$$R^{F1}-X^A-R^{Si} \qquad (1a)$$

$$R^{Si}-X^A-R^{F2}-X^A-R^{Si} \qquad (1b).$$

13 Claims, No Drawings

FLUOROPOLYETHER GROUP-CONTAINING SILANE COMPOUND

CROSS REFERENCE TO RELATED APPLICATIONS

This application is a Rule 53(b) Continuation of International Application No. PCT/JP2020/034141 filed Sep. 9, 2020, claiming priority based on Japanese Patent Application No. 2019-176062 filed Sep. 26, 2019, the respective disclosures of which are incorporated herein by reference in their entirety.

TECHNICAL FIELD

The present disclosure relates to a fluoropolyether group-containing silane compound.

BACKGROUND ART

Certain types of fluorine-containing silane compounds are known to be capable of providing excellent water-repellency, oil-repellency, antifouling property, and the like when used in surface treatment of a base material. A layer obtained from a surface-treating agent containing a fluorine-containing silane compound (hereinafter, also referred to as a "surface-treating layer") is applied as a so-called functional thin film to a large variety of base materials such as glass, plastics, fibers, and building materials.

A known such fluorine-containing compound is a perfluoropolyether group-containing silane compound having a perfluoropolyether group in the molecular backbone and a hydrolyzable group bonding to a Si atom at the molecular terminal or in the terminal part (Patent Documents 1 and 2).

CITATION LIST

Patent Document

Patent Document 1: JP 2014-218639 A
Patent Document 2: JP 2017-082194 A

SUMMARY

The present disclosure provides [1] below.
A fluoropolyether group-containing silane compound of the formula (1a) or the formula (1b):

$$R^{F1}-X^{A}-R^{Si} \tag{1a}$$

$$R^{Si}-X^{A}-R^{F2}-X^{A}-R^{Si} \tag{1b}$$

wherein $R^{F1}$ is each independently at each occurrence $Rf^1-R^F-O_q-$;

$R^{F2}$ is $-Rf^2_p-R^F-O_q-$;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$X^A$ is each independently at each occurrence $-X^1_{r1}-W-X^2_{r2}-$;

$X^1$ is a divalent organic group;

W is a 5-membered heterocyclic ring containing a N atom;

$X^2$ is a divalent organic group;

r1 is 0 or 1;

r2 is 0 or 1;

$R^{Si}$ is each independently at each occurrence represented by the formula (S1):

$$-A^1(Z^1-Si\ R^{11}_n R^{12}_{3-n})_m R^e_{3-m} \tag{S1}$$

$A^1$ is C or Si;

$Z^1$ is each independently at each occurrence a divalent organic group;

$R^{11}$ is each independently at each occurrence a hydroxyl group or a hydrolyzable group;

$R^{12}$ is each independently at each occurrence a hydrogen atom or a monovalent organic group;

n is each independently at each occurrence an integer of 1 to 3;

$R^e$ is each independently at each occurrence a hydrogen atom, a hydroxyl group, or a monovalent organic group; and m is each independently at each occurrence 2 or 3.

Advantageous Effect

According to the present disclosure, there is provided a fluoropolyether group-containing silane compound that can contribute to formation of a surface-treating layer having good friction durability.

DESCRIPTION OF EMBODIMENTS

The term "monovalent organic group", as used herein, refers to a monovalent group containing carbon. The monovalent organic group is not limited, and may be a hydrocarbon group or a derivative thereof. The derivative of a hydrocarbon group represents a group having one or more of N, O, S, Si, amide, sulfonyl, siloxane, carbonyl, carbonyloxy, and the like at the terminal of the hydrocarbon group or in the molecular chain thereof. The term "organic group" refers to a monovalent organic group.

The term "divalent organic group" refers to a divalent group containing carbon. Examples of the divalent organic group include, but are not limited to, a divalent group obtained by further removing one hydrogen atom from an organic group.

The term "hydrocarbon group", as used herein, refers to a group that contains a carbon and a hydrogen and that is obtained by removing one hydrogen atom from a hydrocarbon. Examples of such a hydrocarbon group include, but are not limited to, a $C_{1-20}$ hydrocarbon group, optionally substituted with one or more substituents, such as an aliphatic hydrocarbon group and an aromatic hydrocarbon group. The "aliphatic hydrocarbon group" may be either linear, branched, or cyclic, and may be either saturated or unsaturated. The hydrocarbon group may contain one or more ring structures.

As used herein, examples of the substituent of the "hydrocarbon group" include, but are not limited to, one or more groups selected from a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group, each of which is optionally substituted with one or more halogen atoms.

The term "hydrolyzable group", as used herein, refers to a group which is able to undergo a hydrolysis reaction, i.e., represents a group that can be removed from the main backbone of a compound by a hydrolysis reaction. Examples of the hydrolyzable group include $-OR^h$, $-OCOR^h$, $-O-N=CR^h{}_2$, $-NR^h{}_2$, $-NHR^h$, and halogen (in these formulas, $R^h$ represents a substituted or unsubstituted $C_{1-4}$ alkyl group).

(Fluoropolyether Group-Containing Silane Compound)

The fluoropolyether group-containing silane compound of the present embodiment is represented by the following formula (1a) or (1b):

(1a)

(1b)

In the formula (1a), $R^{F1}$ is each independently at each occurrence $Rf^1-R^F-O_q-$.

In the formula (1b), $R^{F2}$ is $-R^{F2}{}_p-R^F-O_q-$.

In the formula, $Rf^1$ is each independently at each occurrence a $C_{1-16}$ alkyl group optionally substituted with one or more fluorine atoms.

In the $C_{1-16}$ alkyl group optionally substituted with one or more fluorine atoms, the "$C_{1-16}$ alkyl group" may be linear or branched, and is preferably a linear or branched $C_{1-6}$ alkyl group, in particular $C_{1-3}$ alkyl group, and more preferably a linear $C_{1-6}$ alkyl group, in particular $C_{1-3}$ alkyl group.

$R^{f1}$ is preferably a $C_{1-16}$ alkyl group that is substituted with one or more fluorine atoms, more preferably a $CF_2H-C_{1-15}$ perfluoroalkylene group, and still more preferably a $C_{1-16}$ perfluoroalkyl group.

The $C_{1-16}$ perfluoroalkyl group may be linear or branched, and is preferably a linear or branched $C_{1-6}$ perfluoroalkyl group, in particular $C_{1-3}$ perfluoroalkyl group, more preferably a linear $C_{1-6}$ perfluoroalkyl group, in particular $C_{1-3}$ perfluoroalkyl group, and specifically $-CF_3$, $-CF_2CF_3$, or $-CF_2CF_2CF_3$.

In the formula, $Rf^2$ is a $C_{1-6}$ alkylene group optionally substituted with one or more fluorine atoms.

In the $C_{1-6}$ alkylene group optionally substituted with one or more fluorine atoms, the "$C_{1-6}$ alkylene group" may be linear or branched, and is preferably a linear or branched $C_{1-3}$ alkylene group, and more preferably a linear $C_{1-3}$ alkylene group.

$R^{f2}$ is preferably a $C_{1-6}$ alkylene group that is substituted with one or more fluorine atoms, more preferably a $C_{1-6}$ perfluoroalkylene group, and still more preferably a $C_{1-3}$ perfluoroalkylene group.

The $C_{1-6}$ perfluoroalkylene group may be linear or branched, and is preferably a linear or branched $C_{1-3}$ perfluoroalkylene group, more preferably a linear $C_{1-3}$ perfluoroalkylene group, and specifically $-CF_2-$, $-CF_2CF_2-$, or $-CF_2CF_2CF_2-$.

In the formula, p is 0 or 1. In one embodiment, p is 0. In another embodiment, p is 1.

In the formulas, q is each independently at each occurrence 0 or 1. In one embodiment, q is 0. In another embodiment, q is 1.

In the formulas (1a) and (1b), $R^F$ is each independently at each occurrence a divalent fluoropolyether group.

$R^F$ is preferably a fluoropolyether group represented by the following formula:

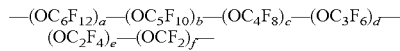

In the formula:
a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

a, b, c, d, e and f may preferably each independently be an integer of 0 to 100.

The sum of a, b, c, d, e and f is preferably 5 or more, and more preferably 10 or more, for example, 15 or more, or 20 or more. The sum of a, b, c, d, e and f is preferably 200 or less, and more preferably 100 or less, and still more preferably 60 or less, for example, 50 or less, or 30 or less.

These repeating units may be linear or branched, and are preferably linear. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, and is preferably $-(OCF_2CF_2CF_2CF_2CF_2CF_2)-$. $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2CF_2)-$. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, and is preferably $-(OCF_2CF_2CF_2CF_2)-$. $-(OC_3F_6)-$ may be any of $-(OCF_2CF_2CF_2)-$, $-(OCF(CF_3)CF_2)-$ and $-(OCF_2CF(CF_3))-$, and is preferably $-(OCF_2CF_2CF_2)-$. Also, $-(OC_2F_4)-$ may be any of $-(OCF_2CF_2)-$O and $-(OCF(CF_3))-$, and is preferably $-(OCF_2CF_2)-$.

In one embodiment, $R^F$ is each independently at each occurrence a group represented by the following formula (f1), (f2), (f3), (f4), or (f5):

$-(OC_3F_6)_d-$ (f1)

wherein d is an integer of 1 to 200;

$-(OC_4F_8)_c-(OC_3F_6)_d-(OC_2F_4)_e-(OCF_2)_f-$ (f2)

wherein c and d are each independently an integer of 0 or more and 30 or less, e and f are each independently an integer of 1 or more and 200 or less;
the sum of c, d, e, and f is 2 or more; and
the occurrence order of the respective repeating units enclosed in parentheses provided with a subscript c, d, e, or f is not limited in the formula;

$-(R^6-R^7)_g-$ (f3)

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or a combination of two or three groups independently selected from these groups; and
g is an integer of 2 to 100;

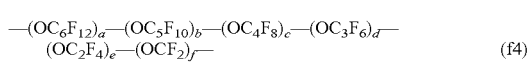(f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; and

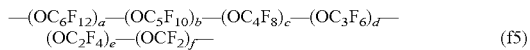(f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

In the formula (f1), d is preferably an integer of 5 to 200, more preferably 10 to 100, still more preferably 15 to 50, for example 25 to 35. The formula (f1) is preferably a group represented by —(OCF$_2$CF$_2$CF$_2$)$_d$— or —(OCF(CF$_3$)CF$_2$)$_d$—, and more preferably a group represented by —(OCF$_2$CF$_2$CF$_2$)$_d$—.

In the formula (f2), e and f are each independently, preferably an integer of 5 or more and 200 or less, and more preferably 10 to 200. Further, the sum of a, b, c, d, e and f is preferably 5 or more, and more preferably 10 or more, for example, 15 or more, or 20 or more. In one embodiment, the formula (f2) is preferably a group represented by —(OCF$_2$CF$_2$CF$_2$CF$_2$)$_c$—(OCF$_2$CF$_2$CF$_2$)$_d$—(OCF$_2$CF$_2$)$_e$—(OCF$_2$)$_f$—. In another embodiment, the formula (f2) may be a group represented by —(OC$_2$F$_4$)$_e$—(OCF$_2$)$_f$—.

In the formula (f3), $R^6$ is preferably OC$_2$F$_4$. In the formula (f3), $R^7$ is preferably a group selected from OC$_2$F$_4$, OC$_3$F$_6$, and OC$_4$F$_8$, or a combination of two or three groups independently selected from these groups, and more preferably a group selected from OC$_3$F$_6$ and OC$_4$F$_8$. Examples of the combination of 2 or 3 groups independently selected from —OC$_2$F$_4$, OC$_3$F$_6$, and OC$_4$F$_8$ include, but are not limited to, —OC$_2$F$_4$OC$_3$F$_6$—, —OC$_2$F$_4$OC$_4$F$_8$—, —OC$_3$F$_6$OC$_2$F$_4$—, —OC$_3$F$_6$OC$_3$F$_6$—, —OC$_3$F$_6$OC$_4$F$_8$—, —OC$_4$F$_8$OC$_4$F$_8$—, —OC$_4$F$_8$OC$_3$F$_6$—, —OC$_4$F$_8$OC$_2$F$_4$—, —OC$_2$F$_4$OC$_2$F$_4$OC$_3$F$_6$—, —OC$_2$F$_4$OC$_2$F$_4$OC$_4$F$_8$—, —OC$_2$F$_4$OC$_3$F$_6$OC$_2$F$_4$—, —OC$_2$F$_4$OC$_3$F$_6$OC$_3$F$_6$—, —OC$_2$F$_4$OC$_4$F$_8$OC$_2$F$_4$, —OC$_3$F$_6$OC$_2$F$_4$OC$_2$F$_4$—, —OC$_3$F$_6$OC$_2$F$_4$OC$_3$F$_6$—, —OC$_3$F$_6$OC$_3$F$_6$OC$_2$F$_4$—, and —OC$_4$F$_8$OC$_2$F$_4$OC$_2$F$_4$. In the formula (f3), g is preferably an integer of 3 or more, and more preferably 5 or more. g is preferably an integer of 50 or less. In the formula (f3), OC$_2$F$_4$, OC$_3$F$_6$, OC$_4$F$_8$, OC$_5$F$_{10}$, and OC$_6$F$_{12}$ may be either linear or branched, and are preferably linear. In this embodiment, the formula (f3) is preferably —(OC$_2$F$_4$—OC$_3$F$_6$)$_g$— or —(OC$_2$F$_4$—OC$_4$F$_8$)$_g$—.

In the formula (f4), e is preferably an integer of 1 or more and 100 or less, and more preferably 5 or more and 100 or less. The sum of a, b, c, d, e and f is preferably 5 or more, and more preferably 10 or more, such as 10 or more and 100 or less.

In the formula (f5), f is preferably an integer of 1 or more and 100 or less, and more preferably 5 or more and 100 or less. The sum of a, b, c, d, e and f is preferably 5 or more, and more preferably 10 or more, such as 10 or more and 100 or less.

In one embodiment, $R^F$ is a group represented by the formula (f1).

In one embodiment, $R^F$ is a group represented by the formula (f2).

In one embodiment, $R^F$ is a group represented by the formula (f3).

In one embodiment, $R^F$ is a group represented by the formula (f4).

In one embodiment, $R^F$ is a group represented by the formula (f5).

The ratio of e to f in $R^F$ (hereinafter, referred to as an "e/f ratio") is 0.1 to 10, preferably 0.2 to 5, more preferably 0.2 to 2, and still more preferably 0.2 to 1.5 or less. With an e/f ratio of 10 or less, the lubricity, friction durability, and chemical resistance (such as durability against (human) sweat) of a surface-treating layer obtained from the compound are further increased. The smaller the e/f ratio is, the higher the lubricity and the friction durability of the surface-treating layer are. On the other hand, with an e/f ratio of 0.1 or more, the stability of the compound can be further increased. The larger the e/f ratio is, the higher the stability of the compound is. In the present embodiment, f is an integer of 1 or more.

In one embodiment, the e/f ratio is preferably 0.2 to 0.9, more preferably 0.2 to 0.85, and still more preferably 0.2 to 0.8.

In one embodiment, from the viewpoint of heat resistance, the e/f ratio is preferably 0.4 or more, and more preferably 0.4 to 1.5.

In one embodiment, from the viewpoint of heat resistance, the e/f ratio may be, for example, 0.9 to 5.0, may be 0.9 to 2.0, or may be 0.9 to 1.5. The lower limit of the e/f ratio is preferably 1.0 or more, and may be, for example, 1.1 or more, or 1.3 or more.

The number average molecular weight of $R^{F1}$ and $R^{F2}$ moieties is not limited, and is, for example, 500 to 30,000, preferably 1,500 to 30,000, more preferably 2,000 to 10,000. Herein, the number average molecular weight of $R^{F1}$ and $R^{F2}$ is defined as a value obtained by $^{19}$F-NMR measurement.

In another embodiment, the number average molecular weight of the $R^{F1}$ and $R^{F2}$ moieties may be 500 to 30,000, preferably 1,000 to 20,000, more preferably 2,000 to 15,000, and still more preferably 2,000 to 10,000, for example, 3,000 to 8,000.

$X^A$ is each independently at each occurrence —$X^1_{r1}$—W—$X^2_{r2}$—. In $X^A$, the left side of $X^1$ is bonded to $R^{F1}$ or $R^{F2}$, and the right side of $X^2$ is bonded to $R^{Si}$.

By having $X^A$ as described above, the friction durability of the surface-treating layer formed by the fluoropolyether group-containing silane compound of the present embodiment can be improved. It is considered that this is because the heterocyclic rings are π-π stacked with each other to contribute to the structural stabilization of the surface-treating layer, and a heteroatom contained in the heterocyclic ring forms a hydrogen bond with a fluoropolyether group (that is, a group represented by $R^F$) through a water molecule or the like which may be present in the surface-treating layer to stabilize the structure of the surface-treating layer.

$X^1$ is a divalent organic group.

In one embodiment, examples of $X^1$ include a divalent organic group represented by the following formula:

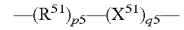

In the formula:

$R^{51}$ is —(CH$_2$)$_{s5}$—;

s5 is an integer of 1 to 20, preferably 1 to 6, more preferably 1 to 3, and still more preferably 1 or 2;

$X^{51}$ represents —(X$^{52}$)$_{15}$—;

$X^{52}$ each independently at each occurrence represents a group selected from the group consisting of —O—, —C(O)O—, —CONR$^{54}$—, —O—CONR$^{54}$—, and —NR$^{54}$—, and preferably represents a group selected from the group consisting of —OC(O)—, —NR$^{54}$CO—, and —NR$^{54}$CO—O—;

$R^{54}$ each independently at each occurrence represents a hydrogen atom, a phenyl group or a C$_{1-6}$ alkyl group (preferably a methyl group), and preferably a hydrogen atom;

15 is an integer of 1 to 10, preferably an integer of 1 to 5, and more preferably an integer of 1 to 3;

p5 is 0 or 1; and q5 is 0 or 1, provided that the occurrence order of the respective repeating units enclosed in parentheses provided with p5 or q5 is not limited, and at least one of p5 and q5 may be 1, and $X^1$ (typically, hydrogen atoms of $X^1$) is optionally substituted with one or more substituents selected from a fluorine atom, a $C_{1-3}$ alkyl group, and a $C_{1-3}$ fluoroalkyl group. In a preferable embodiment, $X^1$ is not substituted with these groups.

$X^1$ may each independently be $$-(R^{51})_{p5}-(X^{51})_{q5}-R^{52}-.$$

$R^{52}$ is a single bond or $-(CH_2)_{t5}-$, preferably $-(CH_2)_{t5}-$. t5 is an integer of 1 to 20, preferably an integer of 2 to 6, and more preferably an integer of 2 to 3. $X^1$ (typically, hydrogen atoms of $X^1$) is optionally substituted with one or more substituents selected from a fluorine atom, a $C_{1-3}$ alkyl group, and a $C_{1-3}$ fluoroalkyl group. In a preferable embodiment, $X^1$ is not substituted with these groups.

Preferably, $X^1$ may each independently be a $C_{1-20}$ alkylene group,
$-R^{51}-X^{52}-R^{52}-$,
$-X^{52}-R^{52}-$, or
$-X^{52}-$.
$R^{51}$, $R^{52}$, and $X^{52}$ have the same definition as above.

In a preferable embodiment, $X^1$ may each independently be
a $C_{1-20}$ alkylene group,
$-(CH_2)_{s5}-X^{52}-$, or
$-(CH_2)_{s5}-X^{52}-(CH_2)_{t5}-$,
wherein
$X^{52}$ is $-O-$, $-CONR^{54}-$, or $-O-CONR^{54}-$, preferably $-CONR^{54}-$ or $-O-CONR^{54}-$;
$R^{54}$ each independently at each occurrence represents a hydrogen atom, a phenyl group or a $C_{1-6}$ alkyl group, and preferably a hydrogen atom and a methyl group;
s5 is an integer of 1 to 20; and
t5 is an integer of 1 to 20.

In the above, $X^1$ is preferably represented by $-(CH_2)_{s5}-$, and s5 is an integer of 1 to 20, preferably 1 to 6, more preferably 1 to 3, and still more preferably 1 or 2, and may be, for example, 1.

$X^1$ is each independently optionally substituted with one or more substituents selected from a fluorine atom, a $C_{1-3}$ alkyl group and a $C_{1-3}$ fluoroalkyl group (preferably, $C_{1-3}$ perfluoroalkyl group). In one embodiment, $X^1$ is unsubstituted.

In one embodiment, $X^1$ may each independently be a group other than an $-O-C_{1-6}$ alkylene group.

Specific examples of $X^1$ include, for example:
$-CH_2OCH_2-$,
$-CH_2O(CH_2)_2-$,
$-CH_2O(CH_2)_3-$,
$-CH_2O(CH_2)_4-$,
$-CH_2O(CH_2)_5-$,
$-CH_2O(CH_2)_6-$,
$-CH_2OCF_2CHFOCF_2-$,
$-CH_2OCF_2CHFOCF_2CF_2-$,
$-CH_2OCF_2CHFOCF_2CF_2CF_2-$,
$-CH_2OCH_2CF_2CF_2OCF_2-$,
$-CH_2OCH_2CF_2CF_2OCF_2CF_2-$,
$-CH_2OCH_2CF_2CF_2OCF_2CF_2CF_2-$,
$-CH_2OCH_2CF_2CF_2OCF(CF_3)CF_2OCF_2-$,
$-CH_2OCH_2CF_2CF_2OCF(CF_3)CF_2OCF_2CF_2-$,
$-CH_2OCH_2CF_2CF_2OCF(CF_3)CF_2OCF_2CF_2CF_2-$,
$-CH_2OCH_2CHFCF_2OCF_2-$,
$-CH_2OCH_2CHFCF_2OCF_2CF_2-$,
$-CH_2OCH_2CHFCF_2OCF_2CF_2CF_2-$,
$-CH_2OCH_2CHFCF_2OCF(CF_3)CF_2OCF_2-$,
$-CH_2OCH_2CHFCF_2OCF(CF_3)CF_2OCF_2CF_2-$,
$-CH_2OCH_2CHFCF_2OCF(CF_3)CF_2OCF_2CF_2$—
$-CH_2OCF_2CHFOCF_2CF_2CF_2-C(O)NH-CH_2-$,
$-CH_2-$,
$-(CH_2)_2-$,
$-(CH_2)_3-$,
$-(CH_2)_4-$,
$-(CH_2)_5-$,
$-(CH_2)_6-$,
$-CO-$,
$-CONH-$,
$-CONH-CH_2-$,
$-CONH-(CH_2)_2-$,
$-CONH-(CH_2)_3-$,
$-CONH-(CH_2)_4-$,
$-CONH-(CH_2)_5-$,
$-CONH-(CH_2)_6-$,
$-CON(CH_3)-(CH_2)-$,
$-CON(CH_3)-(CH_2)_2-$,
$-CON(CH_3)-(CH_2)_3-$,
$-CON(CH_3)-(CH_2)_4-$,
$-CON(CH_3)-(CH_2)_5-$,
$-CON(CH_3)-(CH_2)_6-$,
$-CON(Ph)-(CH_2)-$,
$-CON(Ph)-(CH_2)_2-$,
$-CON(Ph)-(CH_2)_3-$,
$-CON(Ph)-(CH_2)_4-$,
$-CON(Ph)-(CH_2)_5-$,
$-CON(Ph)-(CH_2)_6-$,
$-CONH-(CH_2)NH(CH_2)_3-$,
$-CONH-(CH_2)_2NH(CH_2)_3-$,
$-CONH-(CH_2)_3NH(CH_2)_3-$,
$-CONH-(CH_2)_4NH(CH_2)_3-$,
$-CONH-(CH_2)_5NH(CH_2)_3-$,
$-CONH-(CH_2)_6NH(CH_2)_3-$,
$-CH_2O-CONH-(CH_2)-$,
$-CH_2O-CONH-(CH_2)_2-$,
$-CH_2O-CONH-(CH_2)_3-$,
$-CH_2O-CONH-(CH_2)_4-$,
$-CH_2O-CONH-(CH_2)_5-$,
$-CH_2O-CONH-(CH_2)_6-$,
$-S-(CH_2)_3-$,
$-C(O)O-(CH_2)-$,
$-C(O)O-(CH_2)_2-$,
$-C(O)O-(CH_2)_3-$,
$-C(O)O-(CH_2)_4-$,
$-C(O)O-(CH_2)_5-$,
$-C(O)O-(CH_2)_6-$,
$-OCH_2-$,
$-O(CH_2)_2-$,
$-O(CH_2)_3-$, and
$-OCFHCF_2-$.

$X^2$ is a divalent organic group.

$X^2$ may be a structure described as $X^1$. Unlike $X^1$, in $X^2$, the left side thereof is bonded to W and the right side thereof is bonded to $R^{Si}$.

In the above, $X^2$ is preferably represented by $-(CH_2)_{s5}-$, and s5 is an integer of 1 to 20, preferably 1 to 6, more preferably 1 to 3, and still more preferably 1 or 2, and may be, for example, 1.

r1 is 0 or 1. In one embodiment, r1 is 0. In another embodiment, r1 is 1.

r2 is 0 or 1. In one embodiment, r2 is 0. In another embodiment, r2 is 1.

In one embodiment, either one of r1 and r2 is 1.

In a preferable embodiment, r1 is 0 and r2 is 1.

In a preferable embodiment, r1 is 0, r2 is 1, and $X^2$ is —$(CH_2)_{s5}$—. Here, s5 is an integer of 1 to 3, and preferably 1.

W is a 5-membered heterocyclic ring containing a N atom. The ring structure may be substituted by a substituent. That is, W is a ring structure (5-membered ring) composed of five atoms including a N atom. It is considered that with the structure as described above, the bond distances, bond angles, and the like between the atoms constituting W are within an appropriate range, and as a result, the structure of W can be stably present. Furthermore, W having a structure as described above is considered to be advantageous in terms of stability from the viewpoint of being less susceptible to hydrolysis.

Examples of the substituent include a fluorine atom, a $C_{1-3}$ alkyl group and a $C_{1-3}$ fluoroalkyl group (preferably, $C_{1-3}$ perfluoroalkyl group).

In one embodiment, W is unsubstituted.

Preferably, W is a 5-membered heterocyclic ring having two or more heteroatoms. In other words, W is a ring structure composed of five atoms (5-membered ring), two or more of the five atoms are heteroatoms, and at least one of the heteroatoms is a N atom.

In one embodiment, the two or more heteroatoms are two or more N atoms.

In one embodiment, the two or more heteroatoms are at least one N atom and at least one heteroatom other than N atom. Examples of the heteroatom other than N atom include an O atom and a S atom, and an O atom is preferable.

The number of heteroatoms contained in the ring structure of W is preferably 4 or less, and more preferably 3 or less.

W may have an unsaturated bond. In other words, W is a 5-membered heterocyclic ring containing a N atom, and the heterocyclic ring has an unsaturated bond.

In one embodiment, W may have two double bonds in the ring structure. Examples of the double bond include a carbon-carbon double bond and a carbon-nitrogen double bond.

In one embodiment, W is a 5-membered ring structure consisting of five atoms of the following $B^1$ to $B^5$. $B^1$ to $B^5$ are each independently at each occurrence one atom selected from C, N, and O, and 1 to 3, preferably 2 to 3 of $B^1$ to $B^5$ are each independently N or O. However, any one of $B^1$ to $B^5$ is N. In W, the $B^1$ atom is bonded to $X^1$ (bonded to $R^{F1}$ or $R^{F2}$ when r1=0) and the $B^3$ atom is bonded to $X^2$ (bonded to $R^{Si}$ when r2=0). Preferably, at least one of $B^2$ and $B^5$ is N or O. Preferably, 1 to 2, more preferably 2 unsaturated bonds are present in W.

In the present embodiment, hydrogen atoms bonded to each atom of $B^1$ to $B^5$ may be substituted.

Specific examples of W include the following structures. In the following description, the atom denoted by "*1" is bonded to $X^1$ (for example, —$(CH_2)_{s5}$—) (bonded to $R^{F1}$ or $R^{F2}$ when r1=0), and the atom denoted by "*2" is bonded to $X^2$ (for example, —$(CH_2)_{s5}$—) (bonded to $R^{Si}$ when r2=0).

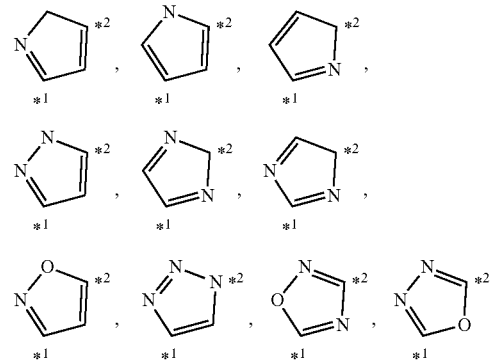

Among the above, the following structures are preferred.

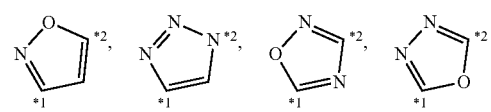

In one embodiment, $X^A$ is represented by the following structure. In the following description, "*1'" and "*2'" are bonds, "*1'" is bonded to $R^{F1}$ or $R^{F2}$, and "*2'" is bonded to $R^{Si}$.

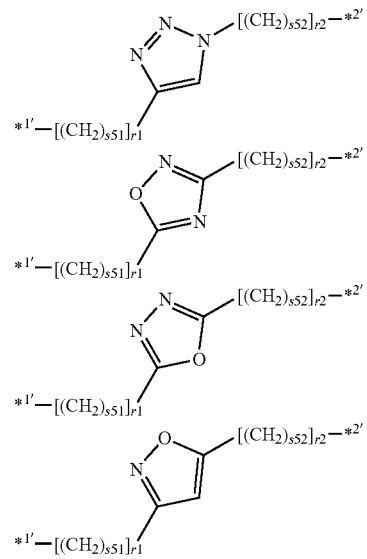

Preferably, $X^A$ is represented by the following structure. In the following description, "*1'" and "*2'" are bonds, "*1'" is bonded to $R^{F1}$ or $R^{F2}$, and "*2'" is bonded to $R^{Si}$.

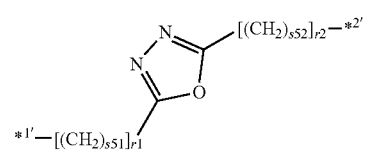

s51 and s52 are each independently at each occurrence an integer of 1 to 3, preferably 1 or 2; r1 is 0 or 1, preferably 0; r2 is 0 or 1, preferably 1; provided that any one of r1 and r2 is preferably 1.

In one embodiment, r1 is 0 or 1 and r2 is 1, preferably r1 is 0 and r2 is 1.

$R^{Si}$ is each independently at each occurrence represented by the formula (S1):

$A^1$ is C or Si. In one embodiment, $A^1$ is C. In one embodiment, $A^1$ is Si.

$Z^1$ is each independently at each occurrence a divalent organic group. The left side of the structure denoted as $Z^1$ below is bonded to $A^1$, and the right side thereof is bonded to $(SiR^{11}{}_n R^{12}{}_{3-n})$.

In a preferable embodiment, $Z^1$ does not include a group which forms a siloxane bond with a silicon atom to which $Z^1$ is bonded.

The divalent organic group in $Z^1$ is preferably a $C_{1-6}$ alkylene group,

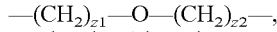

wherein z1 is an integer of 0 to 6, for example, an integer of 1 to 6, and z2 is an integer of 0 to 6, for example, an integer of 1 to 6, and preferably the sum of z1 and z2 is 1 or more, or

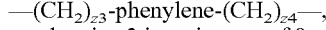

wherein z3 is an integer of 0 to 6, for example, an integer of 1 to 6, and z4 is an integer of 0 to 6, for example, an integer of 1 to 6, and preferably the sum of z3 and z4 is 1 or more.

Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, but are preferably unsubstituted.

In a preferred embodiment, $Z^1$ is a $C_{1-6}$ alkylene group or —$(CH_2)_{z3}$-phenylene-$(CH_2)_{z4}$—, and preferably —phenylene-$(CH_2)_{z4}$—. When $Z^1$ is such a group, light resistance, in particular ultraviolet resistance, can be more increased. Preferably, z3 is an integer of 0 to 6 and z4 is an integer of 1 to 6.

In another preferred embodiment, $Z^1$ is a $C_{1-3}$ alkylene group. In one embodiment, $Z^1$ may be —$CH_2CH_2CH_2$—. In another embodiment, $Z^1$ may be —$CH_2CH_2$—.

$R^{11}$ is each independently at each occurrence a hydroxyl group or a hydrolyzable group, preferably a hydrolyzable group.

$R^{12}$ is each independently at each occurrence a hydrogen atom or a monovalent organic group. Such a monovalent organic group is a monovalent organic group excluding the hydrolyzable group.

In $R^{12}$, the monovalent organic group is preferably a $C_{1-20}$ alkyl group, more preferably a $C_{1-6}$ alkyl group, and still more preferably a methyl group.

n is each independently at each occurrence an integer of 1 to 3, preferably 2 or 3, and more preferably 3.

In a preferable embodiment, n is 3.

$R^e$ is each independently at each occurrence a hydrogen atom, a hydroxyl group, or a monovalent organic group. $R^e$ is a structure excluding the group represented by $(Z^1-SiR^{11}{}_n R^{12}{}_{3-n})$.

In one embodiment, $R^e$ is a hydroxyl group.

In one embodiment, $R^e$ is a monovalent organic group.

In $R^e$, the monovalent organic group is preferably, for example, a $C_{1-20}$ alkyl group, more preferably a $C_{1-6}$ alkyl group, and still more preferably a methyl group.

m is each independently at each occurrence 2 or 3, preferably 3.

In a preferable embodiment, m is 3.

In one embodiment, the fluoropolyether group-containing silane compound of the present embodiment is represented by the formula (1a).

In one embodiment, the fluoropolyether group-containing silane compound of the present embodiment is represented by the formula (1b).

(Production Method)

The fluoropolyether group-containing silane compound represented by the formula (1a) or (1b) can be produced by combining known methods.

In the following embodiments, an example of a method suitable for producing a fluoropolyether group-containing silane compound represented by the formula (1a) or (1b) is shown. It is needless to say that the method for producing the compound represented by the formula (1a) or (1b) is not limited to the following method.

In the present embodiment, the method for producing a fluoropolyether group-containing silane compound of the formula (1a) or (1b) may include a step (I):

silylating a compound represented by the formula (2a) or (2b):

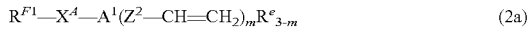

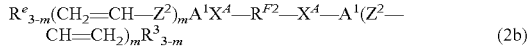

to form a compound of formula (1a) or (1b). $Z^2$ is a group having two fewer carbon atoms than $Z^1$; in other words, $Z^2$—$CH_2CH_2$ corresponds to $Z^1$.

In the formulas (2a) and (2b), $R^{F1}$, $R^{F2}$, $A^1$, $R^e$, and m have the same definition as $R^{F1}$, $R^{F2}$, $A^1$, $R^e$, and m in the formulas (1a) and (1b), respectively. $X^4$ is a group represented by —$X^1{}_{r1}$—W—$X^2{}_{r2}$— as described in the formulas (1a) and (1b), and $X^1$, $X^2$, W, r1, and r2 have the same definition as $X^1$, $X^2$, W, r1, and r2 of the formulas (1a) and (1b), respectively.

The silylation reaction can be carried out using a known method. Examples of known methods include methods described in JP 2014-218639 and JP 2017-82194 A.

In the present embodiment, the method may further include a step (II):

forming a 5-membered heterocyclic ring W containing a N atom by performing at least one of an addition reaction and a condensation reaction to form a compound represented by the formula (2a) or (2b).

Specific examples of the addition reaction and the condensation reaction in the step (II) include an addition reaction, a condensation reaction between two compounds, an intramolecular condensation reaction of one compound, and more specifically, the following steps (II-1) to (II-4).

Step (II-1):

A compound represented by the formula (3a-1) or (3b-1) is reacted with a compound represented by the formula (3c-1) to form a ring structure.

In the above reaction, the following structure is formed as the ring W. The atom denoted by "*1" is bonded to $X^1$ (bonded to $R^{F1}$ or $R^{F2}$ when r1=0), and the atom denoted by "*2" is bonded to $X^2$ (bonded to $R^4$ when r2=0).

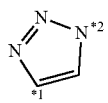

The reaction may be carried out in a suitable solvent in the presence of a suitable catalyst. Examples of the suitable catalysts include, but are not limited to, copper catalysts such as copper iodide, copper bromide, copper chloride and copper sulfate, and reducing agents such as sodium L-ascorbate. Examples of the suitable solvents include, but are not limited to, fluorine-free solvents (for example, dimethyl sulfoxide (DMSO), N,N-dimethylformamide (DMF), methanol, and ethanol), fluorine-containing solvents (for example, m-xylene hexafluoride, hydrofluorocarbons, and hydrochlorofluorocarbons (for example, AK-225: manufactured by AGC), perfluoropolyethers). These solvents may be used alone or in combination of two or more thereof. When two or more solvents are used in combination, it is preferable to use a fluorine-free solvent and a fluorine-containing solvent in combination.

The above step is not limited, but may be performed, for example, at −78 to 200° C. The reaction time in the step is not limited, but may be, for example, 0.1 to 168 hours. The reaction pressure in the step is not limited, but is for example, 0 to 100 MPa (gauge pressure), and is conveniently ambient pressure.

The compound represented by the formula (3c-1) can be synthesized, for example, by diazotizing $H_2N—CH_2X^{30}A^3$ $(Z^3CH=CH_2)_3$. The group represented by $CH_2X^{30}$, $A^3$, and $Z^3$ correspond to $X^2$, $A^1$, and $Z^2$ in the formula (3c-1), respectively.

The diazotization reaction can be carried out by a method which can usually be carried out, for example, a method of reacting with trifluoromethanesulfonyl azide can be used.

As described above, the compound represented by the formula (3c-1) can be a useful intermediate in the synthesis of the compound represented by the formula (1a) or (1b) of the present disclosure.

The present disclosure provides, as one embodiment, a compound represented by the formula (3c-1). In other words, the present disclosure provides a compound represented by the following formula (4-1a). $X^{30}$, $A^3$, and $Z^3$ each have the same definition as above.

$$N_3—CH_2X^{30}A^3 (Z^3—CH=CH_2)_3 \quad (4\text{-}1a)$$

Step (II-2):

A compound represented by the formula (3a-2) or (3b-2) is reacted with a compound represented by the formula (3c-2) to form a ring structure.

 (3a-2)

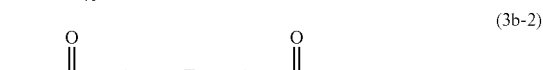 (3b-2)

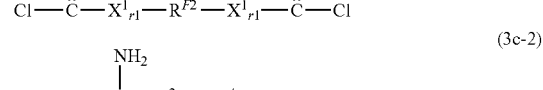 (3c-2)

In the above reaction, the following structure is formed as the ring W. The atom denoted by "*1" is bonded to $X^1$ (bonded to $R^{F1}$ or $R^{F2}$ when r1=0), and the atom denoted by "*2" is bonded to $X^2$ (bonded to $R^A$ when r2=0).

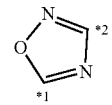

The reaction may be carried out in a suitable solvent in the presence of a suitable catalyst. Examples of the suitable catalysts include, but are not limited to, dehydrating agents such as trifluoromethanesulfonic anhydride, trifluoroacetic anhydride, mesyl chloride, diphosphorus pentoxide, phosphorus oxychloride, and thionyl chloride. Examples of the suitable solvents include, but are not limited to, fluorine-containing solvents (for example, m-xylene hexafluoride, hydrofluorocarbons, and hydrochlorofluorocarbons (for example, AK-225: manufactured by AGC), perfluoropolyethers).

The above step is not limited, but may be performed, for example, at −78 to 200° C. The reaction time in the step is not limited, but may be, for example, 0.1 to 168 hours. The reaction pressure in the step is not limited, but is for example, 0 to 100 MPa (gauge pressure), and is conveniently ambient pressure.

Step (II-3):

A compound represented by the formula (3a-3) or (3b-3) is condensed in the molecule to form a ring structure.

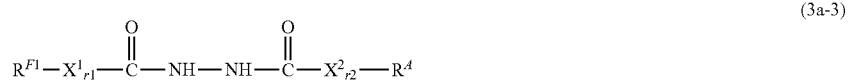 (3a-3)

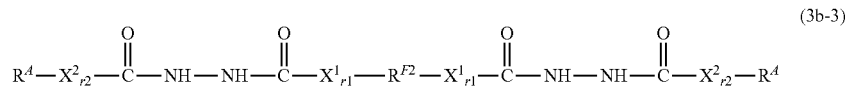 (3b-3)

The reaction may be carried out in a suitable solvent in the presence of a suitable catalyst. Examples of the suitable catalysts include, but are not limited to, dehydrating agents such as trifluoroacetic anhydride, diphosphorus pentoxide, phosphorus oxychloride, and thionyl chloride. Examples of the suitable solvents include, but are not limited to, fluorine-containing solvents (for example, m-xylene hexafluoride, hydrofluorocarbons, and hydrochlorofluorocarbons (for example, AK-225: manufactured by AGC), perfluoropolyethers).

The above step is not limited, but may be performed, for example, at −78 to 200° C. The reaction time in the step is not limited, but may be, for example, 0.1 to 168 hours. The reaction pressure in the step is not limited, but is for example, 0 to 100 MPa (gauge pressure), and is conveniently ambient pressure.

In the above reaction, the following structure is formed as the ring W. The atom denoted by "*1" is bonded to $X^1$ (bonded to $R^{F1}$ or $R^{F2}$ when r1=0), and the atom denoted by "*2" is bonded to $X^2$ (bonded to $R^A$ when r2=0).

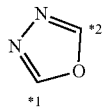

In the formulas (3a-1) to (3c-1), (3a-2) to (3c-2), and (3a-3) to (3b-2), $R^{F1}$, $R^{F2}$, $X^1$, $X^2$, r1, and r2 have the same definition as $R^{F1}$, $R^{F2}$, $X^1$, $X^2$, r1, and r2 of the formula (2a) or (2b), respectively.

$R^A$ has a structure represented by the following formula. $A^1$, $Z^2$, $R^e$, and m in $R^A$ have the same definition as $A^1$, $Z^2$, $R^e$, and m in the formula (2a) or (2b), respectively.

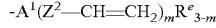

-$A^1(Z^2$—$CH$=$CH_2)_m R^e_{3-m}$

The compound represented by the formula (3a-3) or formula (3b-3) can be synthesized by, for example, but not limited to, a method including the following reactions. In the formulas (4-1b) to (4-1e), the case where m of the structure represented by $R^A$ in the formula (3a-3) or the formula (3b-3) is 3 is described, but m is not limited to 3.

(4a): A compound represented by the formula (4-1b)

$$HC(=O)CH_2X^{31}A^3(Z^3—CH=CH_2)_3 \quad (4\text{-}1b)$$

is oxidized to synthesize a compound represented by the formula (4-1c)

$$HOC(=O)H_2X^{31}A^3(Z^3—CH=CH_2)_3 \quad (4\text{-}1c);$$

(4b): a compound represented by the formula (4-1c) is reacted with tert-butoxycarbonylhydrazine (that is, $(CH_3)_3C$—O—$C(=O)$—$NHNH_2$) to synthesize a compound represented by the formula (4-1d):

$$(CH_3)_3C—O—C(=O)NHNHC(=O)CH_2X^{31}A^3 \\ (Z^3—CH=CH_2)_3 \quad (4\text{-}1d);$$

(4c): from a compound represented by the formula (4-1d), a compound represented by the formula (4-1e)

$$NH_2NHC(=O)CH_2X^{31}A^3(Z^3—CH=CH_2)_3 \quad (4\text{-}1e)$$

is synthesized; and (4d): a compound having a group represented by $R^F$ is introduced into a compound represented by the formula (4-1e).

$A^3$ and $Z^3$ in the formulas (4-1b) to (4-1e) correspond to $A^1$ and $Z^2$ the formulas (3a-3) and (3b-3), respectively.

$X^{31}$ is a single bond or a divalent organic group. In one embodiment, $X^{31}$ is a single bond. In one embodiment, $X^{31}$ is a divalent organic group.

The group represented by —$CH_2$—$X^{31}$— above corresponds to the group represented by $X^2$ contained in $X^A$ (that is, —$X^1_{r1}$—W—$X^2_{r2}$—) of the formula (1a) or (1b).

In one embodiment, the group represented by —$CH_2$—$X^{31}$— may be a divalent organic group represented by —$(R^{51})_{p5}$—$(X^{51})_{q5}$—. $R^{51}$, p5, $X^{51}$, and q5 each have the same definition as above. The group represented by —$CH_2$—$X^{31}$— is preferably represented by —$(CH_2)_{s5}$—. Here, s5 is an integer of 1 to 20, preferably 1 to 6, more preferably 1 to 3, and still more preferably 1 or 2, and may be, for example, 1.

The reaction of (4a) is not limited, but can be carried out at room temperature, for example. The reaction time in the step is not limited, but may be, for example, 1 to 5 hours. The reaction pressure is not limited, but is for example, 0 to 100 MPa (gauge pressure), and is conveniently ambient pressure.

The reaction of (4a) can be carried out, for example, in presence of an alkali-metal hydroxide such as sodium hydroxide and an oxidizing agent such as silver oxide. The addition amounts of the alkali metal hydroxide and the oxidizing agent can be adjusted as appropriate.

The reaction of (4b) is not limited, but can be carried out at room temperature, for example. The reaction time in the step is not limited, but may be, for example, 1 to 10 hours. The reaction pressure is not limited, but is for example, 0 to 100 MPa (gauge pressure), and is conveniently ambient pressure.

The reaction of (4b) can be carried out, for example, in the presence of an amine compound such as triethylamine and a condensing agent such as 1-[bis(dimethylamino)methylene]-1H-1,2,3-triazolo[4,5-b]pyridinium 3-oxide hexafluorophosphate (HATU). N,N-dimethyl-4-aminopyridine (DMAP) may be further added to the reaction of (4b), if necessary. The addition amount of these compounds can be adjusted as appropriate.

The reaction of (4c) is not limited, but can be carried out in an ice bath, for example. The reaction time in the step is not limited, but may be, for example, 1 to 10 hours. The reaction pressure is not limited, but is for example, 0 to 100 MPa (gauge pressure), and is conveniently ambient pressure.

The reaction of (4c) is a reaction for removing (that is, deprotecting) a tert-butoxycarbonyl group as a protective group from a compound represented by the formula (4-1d). The reaction of (4c) can be carried out, for example, in presence of dichloromethane and trifluoroacetic acid. The addition amount of these compounds can be adjusted as appropriate.

The reaction of (4d) is not limited, but can be carried out in an ice bath, for example. The reaction time in the step is not limited, but may be, for example, 1 to 50 hours. The reaction pressure is not limited, but is for example, 0 to 100 MPa (gauge pressure), and is conveniently ambient pressure.

Examples of the compound having a group represented by $R^F$ in the reaction of (4d) include $R^{F1}COOH$, $HOC(=O)R^{F2}COOH$, and acid chlorides of these compounds. $R^{F1}$ and $R^{F2}$ each have the same definition as above. The addition amount of these compounds can be adjusted as appropriate.

The compound represented by the formula (4-1b):

$$HC(=O)CH_2X^{31}A^3(Z^3—CH=CH_2)_3 \quad (4\text{-}1b)$$

can be obtained by, for example, a method including the following step (4-11).

A compound represented by the formula (4-11b):

$$HC(=O)X^{31}A^3(Z^3-CH=CH_2)_3 \quad (4\text{-}11b)$$

is reacted with a one-carbon increasing agent, followed by a hydrolysis reaction under an acidic atmosphere (step (4-11)).

The step (4-11) may be, for example, the following step.

Using methoxymethyltriphenylphosphonium chloride as a one-carbon increasing agent and from a compound represented by the formula (4-11b), a compound represented by the formula (4-11c):

$$CH_3OCH=CH-X^{31}A^3(Z^3-CH=CH_2)_3 \quad (4\text{-}11c)$$

is synthesized and then a compound represented by the formula (4-11c) is hydrolyzed.

In the formulas (4-11b) and (4-11c), $X^{31}$, $A^3$, and $Z^3$ each have the same definition as above.

The reaction represented by the step (4-11) can be carried out under conditions that can be usually carried out. The reaction temperature is not limited, but can be carried out at room temperature, for example. The reaction time in the step is not limited, but may be, for example, 1 to 168 hours. The reaction pressure is not limited, but is for example, 0 to 100 MPa (gauge pressure), and is conveniently ambient pressure.

As described above, the compounds represented by the formulas (4-1f) to (4-1e) can be a useful intermediate in the synthesis of the compound represented by the formula (1a) or (1b) of the present disclosure.

The present disclosure provides, as one embodiment, a compound represented by the formula (4-1b), (4-1c), (4-1d), or (4-1e).

Step (II-4):

A compound represented by the formula (3a-4) or (3b-4) is condensed in the molecule to form a ring structure.

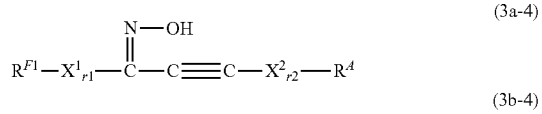

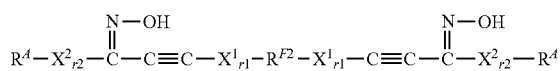

The reaction may be carried out in a suitable solvent in the presence of a suitable catalyst. Examples of the suitable catalysts include, but are not limited to, $AuCl_3$, Lewis-acid catalysts, and acid catalysts such as hydrochloric acids. Examples of the suitable solvents include, but are not limited to, fluorine-containing solvents (for example, m-xylene hexafluoride, hydrofluorocarbons, and hydrochlorofluoro-carbons (for example, AK-225: manufactured by AGC), perfluoropolyethers).

The above step is not limited, but may be performed, for example, at −78 to 200° C. The reaction time in the step is not limited, but may be, for example, 0.1 to 168 hours. The reaction pressure in the step is not limited, but is for example, 0 to 100 MPa (gauge pressure), and is conveniently ambient pressure.

In the above reaction, the following structure is formed as the ring W. The atom denoted by "*1" is bonded to $X^1$ (bonded to $R^{F1}$ or $R^{F2}$ when r1=0), and the atom denoted by "*2" is bonded to $X^2$ (bonded to $R^A$ when r2=0).

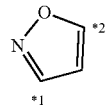

The compound represented by the formula (3a-4) or (3b-4) can be obtained, for example, by a method including the following reaction. In the formula (4-1f), "—CC—" means a structure in which carbon atoms are bonded by a triple bond. In the formula (4-1f), the case where m of the structure represented by $R^A$ in the formula (3a-4) or the formula (3b-4) is 3 is described, but m is not limited to 3.

A compound having a group represented by $R^F$ is introduced into a compound represented by the formula (4-1f):

$$H-CC-CH_2X^{32}A^3(Z^3-CH=CH_2)_3 \quad (4\text{-}1f).$$

$A^3$ and $Z^3$ in the formula (4-1f) correspond to $A^1$ and $Z^2$ in the formula (3b-4) and (3b-4), respectively. $X^{32}$ is a single bond or a divalent organic group and may be, for example, the structure described as $X^{31}$.

The above reaction can be carried out, for example, by reacting the compound represented by the formula (4-1f) with $R^{F1}COOH$ or $HOC(=O)R^{F2}COOH$, or an acid chloride of these compounds, as the compound having a group represented by $R^F$, and then reacting with hydroxylamine under acidic or basic conditions. $R^{F1}$ and $R^{F2}$ each have the same definition as above.

The compound represented by the formula (4-1f):

$$H-CC-CH_2X^{32}A^3(Z^3-CH=CH_2)_3 \quad (4\text{-}1f)$$

can be obtained, for example, by reacting a compound represented by
$OHC-CH_2X^{32}A^3(Z^3-CH=CH_2)_3$
with Ohira-Bestmann reagent. The Ohira-Bestmann reagent refers to dimethyl (1-diazo-2-oxopropyl) phosphonate. The reaction can be carried out, for example, in the presence of potassium carbonate and methanol.

As described above, the compound represented by the formula (4-1f) can be a useful intermediate in the synthesis of the compound represented by the formula (1a) or (1b) of the present disclosure. The present disclosure provides, in one embodiment, a compound represented by the formula (4-1f).

In one embodiment, the present disclosure provides a compound represented by the formula (4-1a), (4-1b), (4-1c), (4-1d), (4-1e), or (4-1f). In the formulas, each symbol is as defined above.

$$N_3-CH_2X^{30}A^3(Z^3-CH=CH_2)_3 \quad (4\text{-}1a)$$

$$HC(=O)CH_2X^{31}A^3(Z^3-CH=CH_2)_3 \quad (4\text{-}1b)$$

$$HOC(=O)H_2X^{31}A^3(Z^3-CH=CH_2)_3 \quad (4\text{-}1c)$$

$$(CH_3)_3C-O-C(=O)NHNHC(=O)CH_2X^{31}A^3 \\ (Z^3-CH=CH_2)_3 \quad (4\text{-}1d)$$

$$NH_2NHC(=O)CH_2X^{31}A^3(Z^3-CH=CH_2)_3 \quad (4\text{-}1e)$$

$$H-CC-CH_2X^{32}A^3(Z^3-CH=CH_2)_3 \quad (4\text{-}1f).$$

The present disclosure provides, as one embodiment, a compound represented by the following formula (4-1):

$$R^3-CH_2-X^3-A^3(Z^3-CH=CH_2)_3 \quad (4\text{-}1)$$

In the formula (4-1),

R³ is a formyl group, a carboxy group, an azido group (that is, N₃—), an ethynyl group, NH₂NHC(=O)—, or (CH₃)₃COC(=O)NHNHC(=O)—;

X³ is a single bond or divalent organic group, specifically a group represented by X³⁰, X³¹, or X³² in the formulas (4-1a) to (4-1f);

A³ is C or Si, preferably C; and

Z³ is each independently a divalent organic group.

(Composition)

Hereinafter, a composition (for example, a surface-treating agent) of the present disclosure will be described.

The composition (for example, a surface-treating agent) of the present disclosure contains at least one fluoropolyether group-containing silane compound represented by the formula (1a) or the formula (1b).

In one embodiment, the composition (for example, a surface-treating agent) of the present disclosure may contain the fluoropolyether group-containing silane compounds represented by the formula (1a) and the formula (1b).

In one embodiment, the lower limit of the ratio (molar ratio) of the fluoropolyether group-containing silane compound represented by the formula (1a) to the fluoropolyether group-containing silane compound represented by the formula (1a) and the fluoropolyether group-containing silane compound represented by the formula (1b) contained in the composition (for example, a surface-treating agent) of the present disclosure may be preferably 0.001, more preferably 0.002, even more preferably 0.005, still more preferably 0.01, particularly preferably 0.02, and especially 0.05. The upper limit of the ratio (molar ratio) of the fluoropolyether group-containing silane compound by the formula (1b) to the fluoropolyether group-containing silane compound represented by the formula (1a) and the fluoropolyether group-containing silane compound represented by the formula (1b) may be preferably 0.35, more preferably 0.30, even more preferably 0.20, and still more preferably 0.15 or 0.10. The ratio (molar ratio) of the fluoropolyether group-containing compound represented by the formula (1b) to the fluoropolyether group-containing silane compound represented by the formula (1a) and the fluoropolyether group-containing silane compound represented by the formula (1b) is preferably 0.001 or more and 0.30 or less, more preferably 0.001 or more and 0.20 or less, even more preferably 0.002 or more and 0.20 or less, still more preferably 0.005 or more and 0.20 or less, and particularly preferably 0.01 or more and 0.20 or less, such as 0.02 or more and 0.20 or less (specifically, 0.15 or less) or 0.05 or more and 0.20 or less (specifically, 0.15 or less). By including the compounds in the above range, the composition of the present disclosure can contribute to formation of a cured layer having good friction durability.

The composition (for example, a surface-treating agent) of the present disclosure can impart water-repellency, oil-repellency, antifouling property, surface lubricity, and friction durability to a base material, and may be suitably used as an antifouling coating agent or water-proof coating agent, although there are no limitations.

The composition (for example, a surface-treating agent) of the present disclosure may further contain a solvent, a (unreactive) fluoropolyether compound that can be understood as a fluorine-containing oil, preferably a perfluoro (poly)ether compound (hereinafter, collectively referred to as a "fluorine-containing oil"), a (unreactive) silicone compound that can be understood as a silicone oil (hereinafter, referred to as a "silicone oil"), a catalyst, a surfactant, a polymerization inhibitor, a sensitizer, and the like.

Examples of the solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, and HFE 7300. Alternatively, the solvent may be a mixed solvent of two or more of such solvents.

Examples of the fluorine-containing oil include, but are not limited to, a compound (perfluoro(poly)ether compound) represented by the following general formula (3):

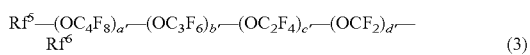

$$Rf^5-(OC_4F_8)_{a'}-(OC_3F_6)_{b'}-(OC_2F_4)_{c'}-(OCF_2)_{d'}-Rf^6 \quad (3)$$

In the formula, Rf⁵ represents an alkyl group having 1 to 16 carbon atoms optionally substituted with one or more fluorine atoms (preferably, a $C_{1-16}$ perfluoroalkyl group), Rf⁶ represents an alkyl group having 1 to 16 carbon atoms optionally substituted with one or more fluorine atoms (preferably, a $C_{1-16}$ perfluoroalkyl group), a fluorine atom, or a hydrogen atom, and Rf⁵ and Rf⁶ are each independently, more preferably, a $C_{1-3}$ perfluoroalkyl group.

a', b', c', and d' respectively represent the numbers of 4 repeating units of perfluoro(poly)ether constituting the main backbone of the polymer and are mutually independently an integer of 0 or more and 300 or less, and the sum of a', b', c', and d' is at least 1, preferably 1 to 300, and more preferably 20 to 300. The occurrence order of the respective repeating units enclosed in parentheses provided with a subscript a', b', c', or d' is not limited in the formula. Among these repeating units, —(OC₄F₈)— may be any of —(OCF₂CF₂CF₂CF₂)—, —(OCF(CF₃)CF₂CF₂)—, —(OCF₂CF(CF₃)CF₂)—, —(OCF₂CF₂CF(CF₃))—, —(OC(CF₃)₂CF₂)—, —(OCF₂C(CF₃)₂)—, —(OCF(CF₃)CF(CF₃))—, —(OCF(C₂F₅)CF₂)—, and (OCF₂CF(C₂F₅))—, and is preferably —(OCF₂CF₂CF₂CF₂)—. —(OC₃F₆)— may be any of —(OCF₂CF₂CF₂)—, —(OCF(CF₃)CF₂)—, and (OCF₂CF(CF₃))—, and is preferably —(OCF$_2$CF$_2$CF$_2$)—. —(OC$_2$F$_4$)— may be any of —(OCF$_2$CF$_2$)— and (OCF(CF$_3$))—, and is preferably —(OCF$_2$CF$_2$)—.

Examples of the perfluoro(poly)ether compound represented by the general formula (3) include a compound represented by any of the following general formula (3a) and the formula (3b) (which may be used singly or as a mixture of two or more).

$$Rf^5\text{—}(OCF_2CF_2CF_2)_{b''}\text{—}Rf^6 \quad (3a)$$

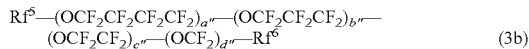

$$Rf^5\text{—}(OCF_2CF_2CF_2CF_2)_{a''}\text{—}(OCF_2CF_2CF_2)_{b''}\text{—}(OCF_2CF_2)_{c''}\text{—}(OCF_2)_{d''}\text{—}Rf^6 \quad (3b)$$

In these formulas, $Rf^5$ and $Rf^6$ are as described above; in the formula (3a), b" is an integer of 1 or more and 100 or less; and in the formula (3b), a" and b" are each independently an integer of 0 or more and 30 or less, and c" and d" are each independently an integer of 1 or more and 300 or less. The occurrence order of the respective repeating units enclosed in parentheses provided with a subscript a", b", c", or d" is not limited in the formulas.

From another viewpoint, the fluorine-containing oil may be a compound represented by general formula $Rf^3$—F wherein $Rf^3$ is a $C_{5-16}$ perfluoroalkyl group. The fluorine-containing oil may be a chlorotrifluoroethylene oligomer.

The fluorine-containing oil may have an average molecular weight of 500 to 10,000. The molecular weight of the fluorine-containing oil may be measured using GPC.

The fluorine-containing oil may be contained in an amount of, for example, 0 to 50% by mass, preferably 0 to 30% by mass, and more preferably 0 to 5% by mass based on the composition (for example, surface-treating agent) of the present disclosure. In one embodiment, the composition of the present disclosure is substantially free of the fluorine-containing oil. Being substantially free of the fluorine-containing oil means that the fluorine-containing oil is not contained at all, or an extremely small amount of the fluorine-containing oil may be contained.

The fluorine-containing oil contributes to increasing the surface lubricity of a layer formed of the composition (for example, surface-treating agent) of the present disclosure.

For example, the silicone oil may be linear or cyclic silicone oil having 2,000 or less siloxane bonds. The linear silicone oil may be so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the composition (for example, a surface-treating agent) of the present disclosure, such a silicone oil may be contained in an amount of, for example, 0 to 300 parts by mass, and preferably 50 to 200 parts by mass, based on the total 100 parts by mass of the fluoropolyether group-containing silane compound of the present disclosure (in the case of two or more kinds, the total thereof, and the same applies below).

The silicone oil contributes to increasing the surface lubricity of a layer formed of the composition (for example, surface-treating agent) of the present disclosure.

Examples of the catalyst include acids (such as acetic acid and trifluoroacetic acid), bases (such as ammonia, triethylamine, and diethylamine), and transition metals (such as Ti, Ni, and Sn).

The catalyst promotes hydrolysis and dehydrative condensation of the fluoropolyether group-containing silane compound of the present disclosure, and promotes formation of a layer formed of the composition (for example, a surface-treating agent) of the present disclosure.

Examples of other components include, in addition to those described above, tetraethoxysilane, methyltrimethoxysilane, 3-aminopropyltrimethoxysilane, 3-glycidoxypropyltrimethoxysilane, and methyltriacetoxysilane.

The composition of the present disclosure can be used as a surface-treating agent for surface treatment of a base material.

(Pellet)

The surface-treating agent of the present disclosure can be formed into pellets by impregnating a porous material such as a porous ceramic material or a metal fiber such as a fiber obtained by, for example, solidifying steel wool in a cotton-like form with the composition. Such pellets can be used in, for example, vacuum deposition.

(Article)

Hereinafter, an article of the present disclosure will be described.

The article of the present disclosure includes: a base material; and a layer (a surface-treating layer) on the surface of the base material, where the layer is formed of the fluoropolyether group-containing silane compound of the present disclosure or a surface-treating agent containing the fluoropolyether group-containing silane compound (hereinafter, these are simply referred to as a "surface-treating agent of the present disclosure", collectively).

The base material that can be used in the present disclosure may be composed of any suitable material such as glass, a resin (which may be a natural or synthetic resin, for example, a common plastic material, and may be in the form of a plate, a film, or the like), a metal, ceramics, a semiconductor (such as silicon and germanium), a fiber (such as woven fabric and nonwoven fabric), fur, leather, a wood material, a ceramic material, a stone material, or a building material.

For example, when the article to be produced is an optical member, the material constituting the surface of the base material may be a material for an optical member, such as glass or a transparent plastic. When the article to be produced is an optical member, some layer (or film) such as a hard coat layer or an antireflection layer may be formed on the surface (the outermost layer) of the base material. The antireflection layer may be any of a single-layer antireflection layer and a multi-layer antireflection layer. Examples of inorganic substances that can be used in the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. One of these inorganic substances may be used singly, or two or more may be used in combination (for example, as a mixture). In the case of a multi-layer antireflection layer, $SiO_2$ and/or $SiO$ is preferably used in the outermost layer thereof. When the article to be produced is an optical glass component for a touch panel, a part of the surface of the base material (glass) may have a transparent electrode such as a thin film in which indium tin oxide (ITO), indium zinc oxide, or the like is used. The base material, according to its specific configuration or the like, may have an insulating layer, an adhesive layer, a protecting layer, a decorated frame layer (I-CON), an atomizing film layer, a hard coating layer, a polarizing film, a phase difference film, a liquid crystal display module, or the like.

The shape of the base material is not limited. The surface region of the base material on which a layer formed by the surface-treating agent of the present disclosure is to be formed is at least a part of the base material surface, and may be suitably determined according to the application, specific specifications, and the like of an article to be produced.

The base material, or at least the surface portion thereof, may be composed of a material originally having a hydroxyl group. Examples of the material include glass as well as metal (in particular, base metal) wherein a natural oxidized film or a thermal oxidized film is formed on the surface, ceramics, semiconductors, and the like. Alternatively, when the base material has an insufficient amount of a hydroxyl group or when the base material originally does not have a hydroxyl group as in resin and the like, a pre-treatment may be performed on the base material to thereby introduce or increase a hydroxyl group on the surface of the base material. Examples of such a pre-treatment include a plasma treatment (e.g., corona discharge) and ion beam irradiation. The plasma treatment can be suitably utilized to not only introduce or increase a hydroxyl group on the base material surface, but also clean the base material surface (remove foreign matter and the like). Another example of the pre-treatment includes a method wherein a monolayer of a surface adsorbent having a carbon-carbon unsaturated bonding group is formed on the base material surface by a LB method (a Langmuir-Blodgett method), a chemical adsorption method, or the like beforehand, and thereafter cleaving the unsaturated bond under an atmosphere containing oxygen, nitrogen, or the like.

Alternatively, the base material may be that of which at least the surface consists of a material comprising other reactive group such as a silicone compound having one or more Si—H group or alkoxysilane.

Then, on the surface of such a base material, a layer of the surface-treating agent of the present disclosure is formed, this layer is post-treated as necessary, and thereby a layer is formed from the surface-treating agent of the present disclosure.

The layer of the surface-treating agent of the present disclosure can be formed by applying the above surface-treating agent on the surface of the base material such that the composition coats the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure can be applied to the base material surface after being diluted with a solvent. From the viewpoint of the stability of the surface-treating agent of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis(trifluoromethyl)benzene); polyfluoroaliphatic hydrocarbons (such as $C_6F_{13}CH_2CH_3$ (such as Asahiklin® AC-6000 manufactured by Asahi Glass Co., Ltd., and 1,1,2,2,3,3,4-heptafluorocyclopentane (such as Zeorora® H manufactured by Zeon Corporation)); alkyl perfluoroalkyl ethers (the perfluoroalkyl group and the alkyl group may be linear or branched) such as hydrofluoroether (HFE) (such as perfluoropropylmethyl ether ($C_3F_7OCH_3$) (such as Novec™ 7000 manufactured by Sumitomo 3M Limited), perfluorobutyl methyl ether ($C_4F_9OCH_3$) (such as Novec™ 7100 manufactured by Sumitomo 3M Limited), perfluorobutyl ethyl ether ($C_4F_9OC_2H_5$) (such as Novec™ 7200 manufactured by Sumitomo 3M Limited), and perfluorohexyl methyl ether ($C_2F_5CF(OCH_3)C_3F_7$) (such as Novec™ 7300 manufactured by Sumitomo 3M Limited), or $CF_3CH_2OCF_2CHF_2$ (such as Asahiklin® AE-3000 manufactured by Asahi Glass Co., Ltd.)). One of these solvents can be used singly, or two or more can be used as a mixture. In particular, hydrofluoroether is preferable, and perfluorobutyl methyl ether ($C_4F_9OCH_3$) and/or perfluorobutyl ethyl ether ($C_4F_9OC_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists in the layer with a catalyst for hydrolysis and dehydrative condensation. Conveniently, in the case of a wet coating method, the surface-treating agent of the present disclosure is diluted with a solvent, and then, immediately before application to the base material surface, a catalyst may be added to the diluted solution of the surface-treating agent of the present disclosure. In the case of a dry coating method, the surface-treating agent of the present disclosure to which a catalyst has been added is directly used to a deposition (usually vacuum deposition) treatment, or a pellet-like material may be used to a deposition (usually vacuum deposition) treatment, wherein the pellet is obtained by impregnating a porous body of metal such as iron or copper with the surface-treating agent of the present disclosure to which the catalyst has been added.

The catalyst may be any suitable acid or base. The acid catalyst may be, for example, acetic acid, formic acid, or trifluoroacetic acid. The base catalyst may be, for example, ammonia or organic amine.

In the above-described manner, a layer derived from the surface-treating agent of the present disclosure is formed on the base material surface, and the article of the present disclosure is produced. The layer thus obtained has both high surface lubricity and high friction durability. The layer may have not only high friction durability but also have, depending on the formulation of the surface-treating agent used, water-repellency, oil-repellency, antifouling properties (e.g., preventing grime such as fingerprints from adhering), waterproof properties (preventing water from entering electronic components and the like), surface lubricity (or lubricity, for example, such as removability by wiping of grim such as fingerprints, and excellent tactile sensations to the fingers), and the like, and may be suitably used as a functional thin film.

That is, the present disclosure further relates to an optical material having a layer derived from the surface-treating agent of the present disclosure as an outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article having a layer obtained according to the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray® discs, DVD discs, CD-Rs, and MOs; optical fibers; and display surfaces of watches and clocks.

The article having a layer obtained according to the present disclosure may be medical equipment or a medical material.

Further, the article having a layer obtained by the present disclosure may be an interior or exterior of an automobile, such as a headlight cover, a side mirror, a side window, an interior decorative film, a center console, a meter panel, and a camera lens cover.

The thickness of the layer is not limited. The thickness of the layer in the case of an optical member is in the range of 1 to 50 nm, 1 to 30 nm, and preferably 1 to 15 nm, from the viewpoint of optical performance, surface lubricity, friction durability, and antifouling property.

Embodiments have been described above, but it will be understood that various modifications can be made to embodiments and details without departing from the spirit and the scope of the claims.

The present disclosure provides [1] to [23] below.

[1]

A fluoropolyether group-containing silane compound of the formula (1a) or the formula (1b):

$$R^{F1}-X^A-R^{Si} \quad (1a)$$

$$R^{Si}-X^A-R^{F2}-X^A-R^{Si} \quad (1b)$$

wherein $R^{F1}$ is each independently at each occurrence $Rf^1-R^F-O_q-$;

$R^{F2}$ is $-Rf^2_p-R^F-O_q-$;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$X^A$ is each independently at each occurrence $-X^1_{r1}-W-X^2_{r2}-$;

$X^1$ is a divalent organic group;

W is a 5-membered heterocyclic ring containing a N atom;

$X^2$ is a divalent organic group;

r1 is 0 or 1;

r2 is 0 or 1;

$R^{Si}$ is each independently at each occurrence represented by the formula (S1):

$$-A^1(Z^1-SiR^{11}_n R^{12}_{3-n})_m R^e_{3-m} \quad (S1)$$

$A^1$ is C or Si;

$Z^1$ is each independently at each occurrence a divalent organic group;

$R^{11}$ is each independently at each occurrence a hydroxyl group or a hydrolyzable group;

$R^{12}$ is each independently at each occurrence a hydrogen atom or a monovalent organic group;

n is each independently at each occurrence an integer of 1 to 3;

$R^e$ is each independently at each occurrence a hydrogen atom, a hydroxyl group, or a monovalent organic group; and m is each independently at each occurrence 2 or 3.

[2]

The fluoropolyether group-containing silane compound according to [1], $R^F$ is each independently at each occurrence a group represented by the formula:

$$-(OC_6F_{12})_a-(OC_5F_{10})_b-(OC_4F_8)_c-(OC_3F_6)_d-(OC_2F_4)_e-(OCF_2)_f-$$

wherein a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

[3]

The fluoropolyether group-containing silane compound of [1] or [2], wherein $R^F$ is each independently at each occurrence represented by the following formula (f1), (f2), (f3), (f4), or (f5):

$$-(OC_3F_6)_d- \quad (f1)$$

wherein d is an integer of 1 to 200;

$$-(OC_4F_8)_c-(OC_3F_6)_d-(OC_2F_4)_e-(OCF_2)_f- \quad (f2)$$

wherein c and d are each independently an integer of 0 or more and 30 or less, e and f are each independently an integer of 1 or more and 200 or less;

the sum of c, d, e, and f is 2 or more; and the occurrence order of the respective repeating units enclosed in parentheses provided with a subscript c, d, e, or f is not limited in the formula;

$$-(R^6-R^7)_g- \quad (f3)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or a combination of two or three groups independently selected from these groups; and g is an integer of 2 to 100;

$$-(OC_6F_{12})_a-(OC_5F_{10})_b-(OC_4F_8)_c-(OC_3F_6)_d-(OC_2F_4)_e-(OCF_2)_f- \quad (f4)$$

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; and $$-(OC_6F_{12})_a-(OC_5F_{10})_b-(OC_4F_8)_c-(OC_3F_6)_d-(OC_2F_4)_e-(OCF_2)_f- \quad (f5)$$

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

[4]

The fluoropolyether group-containing silane compound according to any one of [1] to [3], wherein W is a 5-membered heterocyclic ring having two or more heteroatoms.

[5]
The fluoropolyether group-containing silane compound of [4], wherein the two or more heteroatoms are two or more N atoms.

[6]
The fluoropolyether group-containing silane compound of [4], wherein the two or more heteroatoms are at least one N atom and at least one heteroatom other than N atom.

[7]
The fluoropolyether group-containing silane compound of [6], wherein the heteroatom other than N atom is O atom.

[8]
The fluoropolyether group-containing silane compound of any one of [1] to [7], wherein $X^1$ and $X^2$ are each independently at each occurrence a divalent organic group represented by $-(R^{51})_{p5}-(X^{51})_{q5}-$:
wherein
$R^{51}$ represents $-(CH_2)_{s5}-$;
s5 is an integer of 1 to 20;
$X^{51}$ represents $-(X^{52})_{l5}-$;
$X^{52}$ each independently at each occurrence represents a group selected from the group consisting of $-O-$, $-C(O)O-$, $-CONR^{54}-$, $-O-CONR^{54}-$, and $-NR^{54}-$;
$R^{54}$ each independently at each occurrence represents a hydrogen atom, a phenyl group, or a $C_{1-6}$ alkyl group;
l5 is an integer of 1 to 10;
p5 is 0 or 1; and
q5 is 0 or 1,
provided that the occurrence order of respective repeating units enclosed in parentheses provided with p5 or q5 is not limited.

[9]
The fluoropolyether group-containing silane compound according to any one of [1] to [8], wherein $X^1$ and $X^2$ are each independently at each occurrence a $C_{1-20}$ alkylene group.

[10]
The fluoropolyether group-containing silane compound according to any one of [1] to [9], wherein r1 is 0 and r2 is 1.

[11]
The fluoropolyether group-containing silane compound according to any one of [1] to [10], wherein r1 is 0, r2 is 1, $X^2$ is $-(CH_2)_{s5}-$, and s5 is an integer of 1 to 3.

[12]
The fluoropolyether group-containing silane compound according to any one of [1] to [11], wherein $Z^1$ is a $C_{1-6}$ alkylene group,
$-(CH_2)_{z1}-O-(CH_2)_{z2}-$, or
$-(CH_2)_{z3}$-phenylene-$(CH_2)_{z4}-$.
wherein z1 to z4 are each independently an integer of 0 to 6.

[13]
The fluoropolyether group-containing silane compound according to any one of [1] to [12], wherein m is 3.

[14]
The fluoropolyether group-containing silane compound according to any one of [1] to [13], wherein n is 3.

[15]
A compound represented by the following formula:

$R^3-CH_2-X^3-A^3(Z^3-CH=CH_2)_3$:

wherein
$R^3$ is a formyl group, a carboxy group, an azido group, an ethynyl group, $NH_2NHC(=O)-$, or $(CH_3)_3COC(=O)NHNHC(=O)-$;
$X^3$ is a single bond or a divalent organic group;
$A^3$ is C or Si; and
$Z^3$ is a divalent organic group.

[16]
A surface-treating agent comprising at least one fluoropolyether compound represented by the formula (1a) or the formula (1b) according to any one of [1] to [14].

[17]
The surface-treating agent according to [16], further comprising one or more other components selected from a fluorine-containing oil, a silicone oil, and a catalyst.

[18]
The surface-treating agent according to [16] or [17], further comprising a solvent.

[19]
The surface-treating agent according to any one of [16] to [18], which is used as an antifouling coating agent or a water-proof coating agent.

[20]
The surface-treating agent according to any one of [16] to [19], which is for vacuum deposition.

[21]
A pellet comprising the surface-treating agent according to any one of [16] to [20].

[22]
An article comprising a base material and a layer on a surface of the base material, wherein the layer is formed of the fluoropolyether group-containing silane compound according to any one of [1] to [14] or the surface-treating agent according to any one of [16] to [20].

[23]
The article according to [22], which is an optical member.

EXAMPLES

Hereinafter, the present disclosure will be described with reference to, but is not limited to, Examples. In this Examples, all the chemical formulas shown below represent average compositions. In the following, "Me" represents $CH_3$, and "Boc" represents a tert-butoxycarbonyl group.

Example 1

Synthetic Example 1-1

Synthesis of Weinreb Amide

After dissolving 10.9 g (2.73 mmol) of $CF_3CF_2CF_2(OCF_2CF_2CF_2)_nOCF_2CF_2COOH$ (n is 25) in 18 mL of simply dehydrated m-xylene hexafluoride (mXHF), 40 μl (0.514 mmol) of dimethylformamide (DMF) and 1.4 mL (19.3 mmol) of thionyl chloride were sequentially added to the solution, followed by stirring at room temperature for 10 minutes. Thereafter, the container containing the reaction solution was placed in an oil bath and stirred at 100° C. for 5 hours. After 5 hours, the resulting reaction solution was concentrated to dryness to obtain the acid chloride $CF_3CF_2CF_2(OCF_2CF_2CF_2)_nOCF_2CF_2COCl$.

The acid chloride thus obtained was dissolved in a mixed solvent of 16 mL of simply dehydrated AK 225 (manufactured by AGC) and 6 mL of dehydrated chloroform, and a hydrochloride salt of N,O-dimethylhydroxyamine was added to this solution. Subsequently, at room temperature, 2.7 mL (33.5 mmol) of pyridine was added dropwise over 10 minutes, and the above solution was stirred at 60° C. for 2 days. After 2 days, the resulting reaction solution was washed twice with 10 mL of 1 N HCl followed by one wash with 10 mL of water. The washed reaction solution was filtered through a Kiriyama funnel packed with silica gel in 2 cm, and the filtrate was concentrated to dryness. The product obtained by concentration to dryness was dissolved in 10 mL of AK 225, and the solution was then filtered through a filter. The filtrates were concentrated to dryness to obtain 10.15 g of Weinreb amide represented by the following formula (yield 93%).

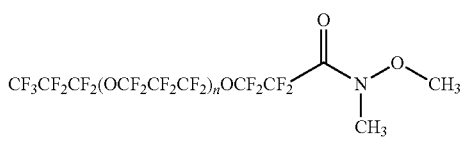

(n is 25)
$^1$H NMR (mXHF, 400 MHz) δ: 3.55 (s, 3H), 4.06 (s, 3H);
$^{19}$F NMR (mXHF, 400 MHz) δ: −84.14-−84.16, −85.60-−85.89, −86.60, −120.44, −131.39-−131.49, −132.40

Synthetic Example 1-2

Synthesis of Aldehyde

After dissolving 4.54 g (1.14 mmol) of Weinreb amide obtained in Synthetic Example 1-1 in 10 mL of simply dehydrated hydrofluoroether (manufactured by 3M, Novec HFE-7200), the reaction solution was cooled to −78° C. Subsequently, 2.38 mL (2.38 mmol) of 1 mol/L diisobutylaluminum hydride (DIBAL-H) was slowly added dropwise over 30 minutes, and then the reaction solution was stirred for 8.5 hours while being naturally warmed from −78° C. to room temperature. After 8.5 hours, 10 mL 1N HCl was added to the reaction solution, and after stirring for 30 minutes, the aqueous phase was removed by separation.

Thereafter, HFE 7200 phase was washed with 10 mL of water and 10 mL of saturated brine and dried over 30 g of sodium sulfate thereafter. Subsequently, the dried HFE7200 solution was filtered using a Kiriyama funnel and then concentrated to dryness. In 10 mL of perfluorohexane, 4.9 g of the product obtained by concentration to dryness was dissolved, and the solution was washed with 10 mL of 1N HCl and 10 mL of water in this order. Subsequently, the perfluorohexane solution was washed with 10 mL of methanol and 10 mL of chloroform in this order. The washed perfluorohexane solution were concentrated to dryness to obtain 4.39 g of aldehyde represented by the following formula (yield 97%).

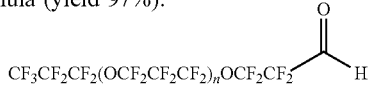

(n is 25)
$^{19}$F NMR (mXHF, 400 MHz) δ: −83.62-−83.70, −84.12-−84.26, −85.45-−85.97, −86.58-−86.73, −128.16-−128.27, −128.51-−128.61, −131.48-−132.00, −132.40

Synthetic Example 1-3

Synthesis of Alkyne

After dissolving 2 g (0.5 mmol) of aldehyde obtained in Synthetic Example 1-2 in a mixed solvent of 3 mL of simply dehydrated HFE 7200 and 1.5 mL of dehydrated methanol, 0.306 g (2.22 mmol) of potassium carbonate was added thereto. Subsequently, 0.2 ml (1.33 mmol) of Ohira-Bestmann reagent was added and stirred overnight at room temperature. The next morning, 20 mL of perfluorohexane was added to the reaction solution, and the mixture was washed twice with 10 mL of chloroform. The washed reaction solution was filtered using a Kiriyama funnel packed with silica gel in 2 cm, and the filtrate was concentrated to dryness to obtain 2 g of alkyne represented by the following formula (yield: 100%).

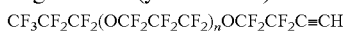

(n is 25)
$^1$H NMR (mXHF, 400 MHz) δ: 3.16 (t, 1H);
$^{19}$F NMR (mXHF, 400 MHz) δ: −84.12-−84.16, −85.59-−85.96, −86.90, −89.99, −105.58, −131.40-−131.63, −132.39

Synthetic Example 1-4

After suspending 3.92 g (60.3 mmol) of sodium azide in 6 mL of dehydrated acetonitrile, the reaction solution was cooled to 0° C. After cooling, 1.4 mL (13.3 mmol) of trifluoromethanesulfonyl chloride was added dropwise to the solution over 10 minutes, and the solution was stirred in an ice bath for 3 hours. After 3 hours, 20 mL of dichloromethane and 10 mL of water was added to the reaction solution and stirred for 5 minutes. After 5 minutes, the dichloromethane phase was extracted and washed again with 10 mL of water to obtain a dichloromethane solution of trifluoromethanesulfonyl azide.

After dissolving 1.1 g (6.65 mmol) of H$_2$NCH$_2$C(CH$_2$CH=CH$_2$)$_3$ and 1.38 g (9.98 mmol) of potassium carbonate in a mixed solvent of 40 mL of methanol and 20 mL of water, 0.166 g (0.665 mmol) of copper sulfate pentahydrate was added thereto. Subsequently, a dichloromethane solution of the trifluoromethanesulfonyl azide synthesized above was added dropwise to the solution over 10 minutes, and the solution was stirred at room temperature for 2 hours. After 2 hours, the reaction solution was washed with 10 mL of saturated aqueous ammonium chloride solution and 10 mL of water, and concentrated to dryness. The product obtained by concentration drying was dissolved in a mixed solvent of 1 mL of ethyl acetate and 10 mL of hexane, and the solution was filtered through a Kiriyama funnel packed with silica gel in 2 cm, and the filtrate was concentrated to dryness to obtain 1.06 g of a compound represented by the following formula (yield: 84%).

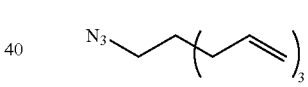

$^1$H NMR (CDCl$_3$, 400 MHz) δ: 2.00-2.05 (m, 6H), 3.16 (s, 2H), 4.90-5.15 (m, 6H), 5.73-5.90 (m, 3H)

Synthetic Example 1-5

Synthesis of Triazole

In a mixed solvent containing 3 mL of AK 225, 1.5 mL of dimethyl sulfoxide (DMSO), and 0.5 mL of water, 1.3827 g (0.346 mmol) of the alkyne obtained in Synthetic Example 1-3 was dissolved. To the resulting solution was added 0.132 g (0.691 mmol) of the compound obtained in Synthetic Example 1-4, 0.0137 g (0.0691 mmol) of sodium L-ascorbate, and 0.0086 g (0.0346 mmol) of copper sulfate pentahydrate in this order, and the mixture was stirred at room temperature overnight. The next morning, 10 mL of AK 225 was added to the reaction solution, washed with 10 mL of water, and concentrated to dryness. The product obtained by concentration drying was dissolved in 20 mL of perfluorohexane, and the mixture was washed twice with 10 mL of chloroform, and dried using 10 g of sodium sulfate. Subsequently, the solution was filtered through a Kiriyama funnel, and the filtrate was concentrated to dryness and purified by flash column chromatography using silica gel to obtain 0.883 g of triazole represented by the following formula (yield: 64%).

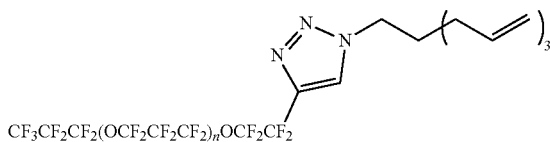

CF₃CF₂CF₂(OCF₂CF₂CF₂)ₙOCF₂CF₂

(n is 25)
¹H NMR (mXHF, 400 MHz) δ: 2.35-2.40 (m, 6H), 4.57 (s, 2H), 5.42-5.54 (m, 6H), 6.16-6.27 (m, 3H)
¹⁹F NMR (mXHF, 400 MHz) δ: −84.12--84.16, −85.50--86.00, −86.58, −86.59, −89.04--89.11, −114.53, −131.39--131.96, −132.39

Synthetic Example 1-6

Hydrosilylation of Triazole

After dissolving 0.883 g (0.221 mmol) of triazole obtained in Synthetic Example 1-5 in 1.2 mL of simply dehydrated mXHF, 60 μl (0.277×10⁻² mmol) of Karstedt catalyst and 10 μl (0.11 mmol) of aniline were added thereto in this order. After stirring at room temperature for 30 minutes, 0.2 mL (1.57 mmol) of trimethoxysilane was added to the reaction solution and stirred at room temperature for 2 hours. After 2 hours, 1.5 mL of simply dehydrated HFE 7200 was added. To the reaction solution was added 0.04 g of activated carbon and stirred at room temperature for 30 minutes. After 30 minutes, filter filtration was performed, and the filtrate was concentrated to dryness to obtain 0.93 g of hydrosilyl triazole represented by the following formula (yield: 100%).

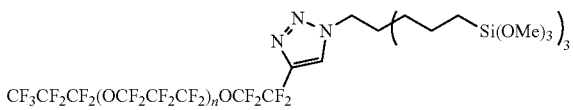

CF₃CF₂CF₂(OCF₂CF₂CF₂)ₙOCF₂CF₂

(n is 25)
¹H NMR (mXHF, 400 MHz) δ: 0.96-1.00 (m, 6H), 1.55-1.65 (m, 6H), 1.90-1.98 (m, 6H), 4.57 (s, 2H)
¹⁹F NMR (mXHF, 400 MHz) δ: −84.14--84.16, −85.50--86.00, −86.58, −86.59, −88.59--88.64, −114.50--114.30, −131.39--131.96, −132.39

Example 2

Synthetic Example 2-1

After suspending 3.6 g (21.7 mmol) of HOCH₂C(CH₂CH=CH₂)₃ and 36 g of activated molecular sieves 4 Å in 50 mL of dichloromethane, 12.21 g (32.5 mmol) of pyridinium dichromate (PDC) was added in three portions. After stirring for 5 hours at room temperature, the solution was filtered using a Kiriyama funnel packed with silica gel in 2 cm, and the filtrate was concentrated to dryness to obtain 3.47 g of a compound represented by the following formula (yield: 98%).

¹H NMR(CDCl₃, 400 MHz) δ: 2.26-2.29 (m, 6H), 5.00-5.11 (m, 6H), 5.66-5.80 (m, 3H), 9.52 (s, 1H).

Synthetic Example 2-2

Synthesis of Methoxy Compound

In 60 mL of tetrahydrofuran (THF), 17.5 g (51.1 mmol) of methoxymethyltriphenylphosphonium chloride was dissolved. Thereafter, 6.5 g (58.0 mmol) of potassium tert-butoxide (t-BuOK) was added and the solution was stirred at room temperature for 1 hour. After 1 hour, 5.6 g (34.1 mmol) of the compound obtained in Synthetic Example 2-1 was added and the solution was stirred at room temperature for 4 hours. After 4 hours, 120 mL of ethyl acetate was added to the reaction solution, and the mixture was washed twice with 40 mL of water, and dried over 30 g of sodium sulfate. The dried solution was then filtered through a Kiriyama funnel, and the filtrate was concentrated to dryness. Thereafter, the mixture was purified by flash column chromatography using silica gel to obtain 6.26 g of a methoxy compound as a mixture of an E form and a Z form (E form is represented by the following formula) (yield: 95%).

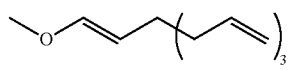

¹H NMR (CDCl₃, 400 MHz) δ: 2.05-2.09 (m, 6H), 2.20-2.25 (m, 6H), 3.50-3.54 (m, 6H), 3.99-4.02 (m, 1H), 4.60-4.67 (m, 1H), 5.00-5.10 (m, 12H), 5.75-5.80 (m, 6H), 6.15-6.19 (m, 1H)

Synthetic Example 2-3

After dissolving 1.26 g (6.55 mmol) of the methoxy compound obtained in Synthetic Example 2-2 in 6 mL of THF, 3 mL of 6N HCl was added thereto, and the solution was stirred at room temperature for 7 hours. After 7 hours, to the reaction solution was added 20 mL of a mixed solution of ethyl acetate and hexane (ethyl acetate:hexane=1:4), and the mixture was washed twice with 100 mL of water, and dried using 20 g of sodium sulfate. Subsequently, the dried solution was filtered through a Kiriyama funnel, and the filtrate was concentrated to dryness to obtain 1.04 g of a compound represented by the following formula in which the number of carbon atoms was increased by one (yield: 97%).

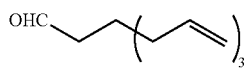

¹H NMR (CDCl₃, 400 MHz) δ: 2.15-2.17 (m, 6H), 2.30 (s, 2H), 5.00-5.13 (m, 6H), 5.76-5.90 (m, 3H), 9.84 (s, 1H)

Synthetic Example 2-4

Synthesis of Carboxylic Acid

After dissolving 0.35 g (1.96 mmol) of the compound obtained in Synthetic Example 2-3 in 10 mL of water, 0.392 g (9.81 mmol) of sodium hydroxide and 0.477 g (2.06 mmol) of silver oxide were added in this order, and the mixture was stirred at room temperature for 2.5 hours. After 2.5 hours, 10 mL of diethyl ether was added to the reaction solution, and the mixture was stirred for 5 minutes, and filtered through a Kiriyama funnel. After the diethyl ether phase of the filtrate was removed by separation, the aqueous phase was acidified with 10 mL of 1N HCl, and extracted with 10 mL of diethyl ether three times. The diethyl ether solution was washed with 10 mL of water and 10 mL of saturated brine in this order, and then dried over 30 g of sodium sulfate. Subsequently, this solution was filtered through a Kiriyama funnel, and the filtrate was concentrated to dryness to obtain 0.324 g of a carboxylic acid represented by the following formula (yield: 85%).

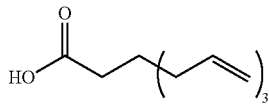

$^1$H NMR (CDCl$_3$, 400 MHz) δ: 2.14-2.18 (m, 6H), 2.26 (s, 2H), 5.05-5.15 (m, 6H), 5.75-5.90 (m, 3H)

Synthetic Example 2-5

After dissolving 0.667 g (3.43 mmol) of the carboxylic acid obtained in Synthetic Example 2-4 in 5 mL of dehydrated acetonitrile, 1 mL (7.21 mmol) of triethylamine, 0.491 g (3.61 mmol) of tert-butoxycarbonylhydrazine (that is, Boc hydrazine), and 1.57 g (4-12 mmol) of 1-[bis(dimethylamino)methylene]-1H-1,2,3-triazolo[4,5-b]pyridinium 3-oxide hexafluorophosphate (HATU) were added thereto in this order. After stirring at room temperature for 4 hours, 6.67×10$^{-2}$ g (0.546 mmol) of N,N-dimethyl-4-aminopyridine (DMAP) was added and stirred overnight. The next morning, after concentrating the reaction solution, 20 mL of diethyl ether was added to the reaction solution, and the solution was washed with 10 mL of saturated aqueous sodium hydrogen carbonate solution, 10 mL of water, and 10 mL of saturated brine in that order, and then dried over 30 g of sodium sulfate. Subsequently, the solution was filtered through a Kiriyama funnel, and the filtrate was concentrated to dryness and purified by flash column chromatography using silica gel to obtain 0.892 g of tert-butoxycarbonylhydrazide (that is, Boc hydrazide) (yield: 84%).

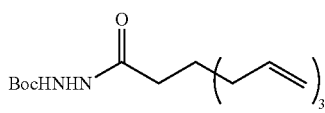

$^1$H NMR (CDCl$_3$, 400 MHz) δ: 1.46 (s, 9H), 2.09 (s, 2H), 2.15-2.20 (m, 6H), 4.90-5.14 (m, 6H), 5.75-5.90 (m, 3H), 6.43 (br s, 1H), 7.21 (br s, 1H)

Synthetic Example 2-6

Synthesis of Hydrazide

After dissolving 5.1 g (16.5 mmol) of Boc hydrazide obtained in Synthetic Example 2-5 in 15 mL of dichloromethane, the mixture was immersed in an ice bath and stirred for 10 minutes. After 10 minutes, 15 mL of trifluoroacetic acid (TFA) was added to the solution and stirred for 5 hours. After 5 hours, the mixture was concentrated to dryness, and then 20 mL of chloroform and 20 mL of saturated aqueous sodium hydrogen carbonate solution were added to the product obtained by the concentration to dryness, and the mixture was stirred for 5 minutes. After removing the aqueous phase, the resultant was washed with 10 mL of saturated brine, and dried over 30 g of sodium sulfate. Finally, the solution was filtered through a Kiriyama funnel, and the filtrate was concentrated to dryness and purified by flash column chromatography using silica gel to obtain 2.66 g of hydrazide represented by the following formula (yield: 77%).

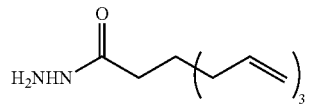

$^1$H NMR (CDCl$_3$, 400 MHz) δ: 2.02 (s, 2H), 2.14-2.18 (m, 6H), 3.85 (br s, 2H), 5.03-5.20 (m, 6H), 5.82-5.88 (m, 3H), 6.70 (br s, 1H)

Synthetic Example 2-7

Synthesis of Hydrazide

After dissolving 4.0 g (1 mmol) of CF$_3$CF$_2$CF$_2$(OCF$_2$CF$_2$CF$_2$)$_n$OCF$_2$CF$_2$COOH (n is 25) in 14 mL of simply dehydrated mXHF, 15.6 μl (0.2 mmol) of DMF and 0.58 mL (8 mmol) of thionyl chloride were sequentially added to the solution, followed by stirring at room temperature for 10 minutes. After 10 minutes, the reaction solution was immersed in an oil bath and stirred at 100° C. for 5 hours. After 5 hours, the reaction solution was concentrated to dryness to obtain an acid chloride.

After dissolving 0.312 g (1.5 mmol) of hydrazide obtained in Synthetic Example 2-6 in 2 mL of simply dehydrated mXHF, 0.4 g of activated molecular sieves 4 Å and 0.418 ml (3 mmol) of triethylamine were added in this order. After immersing the reaction solution in an ice bath for 10 minutes, a solution obtained by dissolving the acid chloride obtained above in 4 mL of simply dehydrated mXHF was slowly added dropwise. After stirring overnight, the reaction solution was filtered through a Kiriyama funnel and concentrated to dryness. To the product obtained by concentration to dryness was added 20 mL of perfluorohexane, and the mixture was washed twice with 10 mL of dichloromethane, and concentrated to dryness. The product obtained by concentration to dryness was purified by flash column chromatography using silica gel to obtain 4.02 g of hydrazide represented by the following formula (yield: 96%).

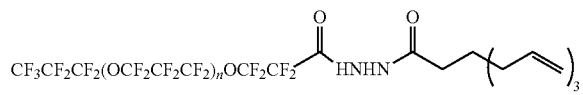

(n=25)
$^1$H NMR (mXHF, 400 MHz) δ: 2.50-2.55 (m, 8H), 5.44-5.50 (m, 6H), 6.17-6.27 (m, 3H);
$^{19}$F NMR (mXHF, 400 MHz) δ: −84.14, −85.49--85.59, −86.50--86.59, −87.42, −125.63, −131.39--131.47, −132.39.

Synthetic Example 2-8

Synthesis of Cyclized Product

After dissolving 0.73 g (0.175 mmol) of hydrazide obtained in Synthetic Example 2-7 in 3 mL of simply dehydrated mXHF, 80 μl (0.574 mmol) of triethylamine and 0.1 g (0.525 mmol) of tosyl chloride were added in this order, and the mixture was stirred at room temperature overnight. The next morning, 20 mL of perfluorohexane was added to the reaction solution, and the mixture was washed twice with 10 mL of chloroform. Subsequently, the mixture was washed with 10 mL of water and 10 mL of methanol and concentrated to dryness. The product obtained by concentration to dryness was dissolved in 95 mL of a mixed solvent of propanol pentafluoride (5FP) and HFE 7200 (5FP:HFE 7200=1:8.5), and the solution was filtered through a Kiriyama funnel packed with amino silica gel in 3 cm, and concentrated to dryness to obtain 0.7 g of a cyclized product represented by the following formula (yield: 96%).

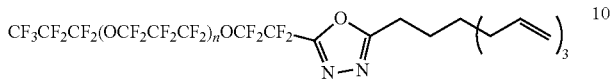

(n=25)
$^1$H NMR (mXHF, 400 MHz) δ: 2.36-2.51 (m, 6H), 3.18 (s, 2H), 5.41-5.45 (m, 6H), 6.13-6.20 (m, 3H);
$^{19}$F NMR (mXHF, 400 MHz) δ: −84.14, −85.59, −86.58, −87.71, −117.94, −131.36−−131.47, −132.39

Synthetic Example 2-9

Hydrosilylation of Cyclized Product

After dissolving 0.99 g (0.248 mmol) of cyclized product obtained by the method of Synthetic Example 2-8 in 1.5 mL of simply dehydrated mXHF, 50 μl (0.23×10$^{−2}$ mmol) of Karstedt catalyst and 10 μl (0.11 mmol) of aniline were added thereto in this order. After stirring at room temperature for 30 minutes, 0.25 mL (1.96 mmol) of trimethoxysilane was added and stirred at room temperature for 2 hours. After 2 hours, 1.5 mL of simply dehydrated HFE 7200 was added. To the reaction solution was added 0.035 g of activated carbon and stirred at room temperature for 30 minutes. After 30 minutes, filter filtration was performed, and the filtrate was concentrated to dryness to obtain 0.969 g of hydrosilyl 1,3,4-oxadiazole represented by the following formula (yield: 98%).

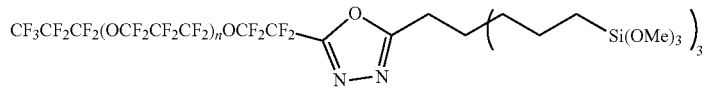

(n=25)
$^1$H NMR (mXHF, 400 MHz) δ: 0.98-1.08 (m, 6H), 1.73-1.77 (m, 6H), 1.91-1.95 (m, 6H), 3.17 (s, 2H), 3.93-4.12 (m, 27H);
$^{19}$F NMR (mXHF, 400 MHz) δ: −84.14, −85.00−−86.00, −86.58, −87.71, −117.94, −131.36−−131.47, −132.39

Example 3

Synthetic Example 3-1

After dissolving 1.5 g (9.02 mmol) of HOCH$_2$C(CH$_2$CH=CH$_2$)$_3$ in 20 mL of dehydrated dichloromethane, the mixture was immersed in an ice bath, and 1.02 mL (12.6 mmol) of pyridine and 1.92 g (11.7 mmol) of trifluoromethanesulfonic anhydride (Tf$_2$O) were added thereto in this order. After 2 hours, the mixture was washed with 10 mL of 1N HCl and then with 10 mL of water. Subsequently, the resultant was washed with 10 mL of saturated brine, and dried over 30 g of sodium sulfate. Finally, the solution was filtered through a Kiriyama funnel and concentrated to dryness to obtain 2.69 g of triflate (yield: 100%).

The triflate was dissolved in 5 mL of dehydrated DMSO, 2.21 g (45.1 mmol) of sodium cyanide was added thereto, and the mixture was stirred overnight in an oil bath at a bath temperature of 100° C. The next morning, 50 mL of water and 20 mL of diethyl ether were added to the reaction solution, and after stirring for 5 minutes, the aqueous phase was removed, and then washed again with 10 mL of water. Subsequently, the aqueous phase was removed, washed using 10 mL of saturated brine, and dried over 30 g of sodium sulfate. Finally, the solution was filtered through a Kiriyama funnel, and the filtrate was concentrated to dryness and purified by flash column chromatography using silica gel to obtain 1.58 g of a compound represented by the following formula (yield: 100%).

$^1$H NMR (CDCl$_3$, 400 MHz) δ: 2.03-2.28 (m, 8H), 5.10-5.20 (m, 6H), 5.70-5.90 (m, 3H)

Synthetic Example 3-2

After dissolving 0.311 g (1.78 mmol) of the compound obtained in Synthetic Example 3-1 was dissolved in 15 mL of dehydrated DMSO, the mixture was immersed in an ice bath, 4.95 mL (35.5 mmol) of triethylamine and 2.47 g (35.5 mmol) of hydroxyamine hydrochloride were added thereto in this order, and the mixture was stirred. After 10 minutes, the mixture was immersed in an oil bath at a bath temperature of 40° C. and stirred overnight. The next morning, 200 mL of water and 20 mL of diethyl ether were added to the reaction solution, and after stirring for 5 minutes, the aqueous phase was removed and then the resultant was washed again with 20 mL of water. Subsequently, the resultant was washed with 10 mL of saturated brine, and dried over 30 g of sodium sulfate. Finally, the solution was filtered through a Kiriyama funnel, and the filtrate was concentrated to dryness and purified by flash column chromatography using silica gel to obtain 0.181 g of a mixture of an E form and a Z form (E form is represented by the following formula) (yield: 49%).

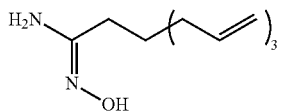

$^1$H NMR (CDCl$_3$, 400 MHz) δ: 2.10-2.20 (m, 8H), 4.98 (br s, 1H), 5.05-5.15 (m, 6H), 5.80-5.92 (m, 3H)

Synthetic Example 3-3

Synthesis of Cyclized Product

After dissolving 2.16 g (0.54 mmol) of CF$_3$CF$_2$CF$_2$(OCF$_2$CF$_2$CF$_2$)$_n$OCF$_2$CF$_2$COOH (n is 25) in 3 mL of simply dehydrated mXHF, 15.6 μl (0.2 mmol) of DMF and 0.58 mL (8 mmol) of thionyl chloride were sequentially added to the solution, followed by stirring at room temperature for 10 minutes. After 10 minutes, the reaction solution was immersed in an oil bath and stirred at 100° C. for 5 hours. After 5 hours, the reaction solution was concentrated to dryness to obtain an acid chloride.

After dissolving 0.18 g (0.864 mmol) of the compound obtained in Synthetic Example 3-2 in 4 mL of dehydrated DMF, and the mixture was immersed in a water bath and stirred. After 10 minutes, 0.241 mL (1.73 mmol) of triethylamine was added, and a solution obtained by dissolving the acid chloride obtained above in 2 mL of simply dehydrated mXHF was added over 5 minutes. After 1 hour, the mixture was immersed in an oil bath at a bath temperature of 100° C. and stirred overnight. The next morning, 20 mL of perfluorohexane was added to the reaction solution, and the mixture was washed twice with 10 mL of chloroform. Subsequently, the mixture was washed with 10 mL of methanol and concentrated to dryness. The product obtained by concentration to dryness was dissolved in 20 mL of mXHF, and the solution was filtered through a Kiriyama funnel packed with silica gel in 3 cm, and concentrated to dryness to obtain 1.238 g of a cyclized product represented by the following formula (yield: 57%).

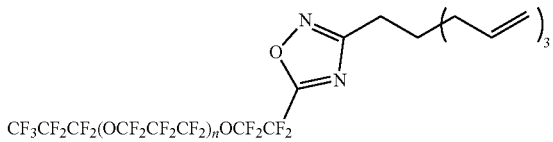

CF$_3$CF$_2$CF$_2$(OCF$_2$CF$_2$CF$_2$)$_n$OCF$_2$CF$_2$ (n=25)

$^1$H NMR (mXHF, 400 MHz) δ: 2.30-2.47 (m, 6H), 3.08 (s, 2H), 5.30-5.46 (m, 6H), 6.10-6.25 (m, 3H);

$^{19}$F NMR (mXHF, 400 MHz) δ: −84.10--−84.16, −85.40--−85.60, −86.50--−86.69, −88.15--−88.39, −118.33--−118.51, −131.35--−131.96, −132.40

Synthetic Example 3-4

Hydrosilylation of Cyclized Product

After dissolving 1.552 g (0.388 mmol) of cyclized product obtained in the same manner as in Synthetic Example 3-3 in 1.7 mL of simply dehydrated mXHF, 67 μl (0.31×10$^{-2}$ mmol) of Karstedt catalyst and 14 μl (0.155 mmol) of aniline were added thereto in this order. After stirring at room temperature for 30 minutes, 0.371 mL (2.91 mmol) of trimethoxysilane was added and stirred at room temperature for 2 hours. After 2 hours, 1.5 mL of simply dehydrated HFE 7200 was added. To the reaction solution was added 0.055 g of activated carbon and stirred at room temperature for 30 minutes. After 30 minutes, filter filtration was performed, and the filtrate was concentrated to dryness to obtain 1.6 g of hydrosilyl 1,2,4-oxadiazole represented by the following formula (yield: 100%).

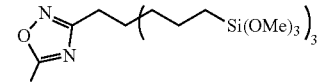

CF$_3$CF$_2$CF$_2$(OCF$_2$CF$_2$CF$_2$)$_n$OCF$_2$CF$_2$ (n=25)

$^1$H NMR (mXHF, 400 MHz) δ: 0.98-1.08 (m, 6H), 1.73-1.77 (m, 6H), 1.91-1.95 (m, 6H), 3.17 (s, 2H), 3.93-4.12 (m, 27H);

$^{19}$F NMR (mXHF, 400 MHz) δ: −84.06--−84.21, −85.00--−85.78, −86.50--−86.68, −87.84--−88.06, −118.42, −131.24--131.48, −132.40

Example 4

Synthetic Example 4-1

After dissolving 0.59 g (3.31 mmol) of OHC—CH$_2$C(CH$_2$CH=CH$_2$)$_3$ in 10 mL of dehydrated methanol, 2.02 g (14.6 mmol) of potassium carbonate and 1.09 mL (7.29 mmol) of Ohira-Bestmann reagent were added in this order, and the mixture was stirred at room temperature for 3 hours. After 3 hours, 20 mL of diethyl ether was added to the reaction solution, and the mixture was washed twice with 100 mL of water, washed with 10 mL of saturated brine, and dried over 20 g of sodium sulfate. Subsequently, this solution was then filtered through a Kiriyama funnel, and the filtrate was concentrated to dryness. The residue was dissolved in 40 mL of hexane, and the solution was filtered using a Kiriyama funnel packed with silica gel in 3 cm, and the filtrate was concentrated to dryness to obtain 0.6 g of a compound represented by the following formula (yield: 100%).

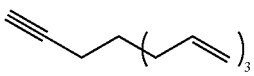

¹H NMR (CDCl₃, 400 MHz) δ: 1.99 (s, 1H), 2.00-2.15 (m, 8H), 5.00-5.20 (m, 6H), 5.75-5.85 (m, 3H)

Synthetic Example 4-2

Synthesis of Alkynone

After dissolving 0.2 g (1.15 mmol) of the compound obtained in Synthetic Example 4-1 in 3 mL of dehydrated THF, the solution was immersed in an ice bath containing dry ice and acetone, and the internal temperature was cooled to −78° C. After cooling, 0.795 mL (1.32 mmol) of n-BuLi (1.66 mol/L) was added dropwise to the solution over 10 minutes, and the solution was stirred for 1 hour with a natural temperature rise. After 1 hour, the internal temperature was cooled again to −78° C., and a solution in which 2.3 g (0.574 mmol) of Weinreb obtained in Example 1 was dissolved in 2 mL of simply dehydrated HFE 7200 was added dropwise thereto over 5 minutes. After the dropwise addition, the mixture was stirred overnight with a natural temperature rise. The next morning, 20 mL of perfluorohexane and 20 mL of 1N HCl were added to the reaction solution, and after stirring for 30 minutes, the aqueous phase was removed by separation. Subsequently, the perfluorohexane phase was washed with 10 mL of water, washed with 10 mL of methanol, washed twice with 10 mL of chloroform, and concentrated to dryness. The product obtained by concentrated coagulation was dissolved in 160 mL of a mixed solvent of perfluorohexane:mXHF=10:1. The solution was filtered using a Kiriyama funnel packed with silica gel in 3 cm, and the filtrate was concentrated to dryness to obtain 0.997 g of an alkynone represented by the following formula (yield: 43%).

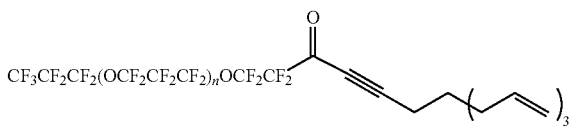

(n is 25)
¹H NMR (mXHF, 400 MHz) δ: 2.40-2.50 (m, 6H), 2.67 (s, 2H), 5.40-5.47 (m, 6H), 6.07-6.20 (m, 3H);
¹⁹F NMR (mXHF, 400 MHz) δ: −83.98--84.25, −85.40--85.60, −86.58, −87.22, −123.66, −131.35--131.66, −132.39

Synthetic Example 4-3

Synthesis of Oxime

After dissolving 0.5 g (0.125 mmol) of the alkynone obtained in Synthetic Example 4-2 in 3 mL of AK 225 and 2 mL of DMSO, 0.087 g of hydroxylamine hydrochloride (1.25 mmol) and 0.103 g (1.25 mmol) of sodium acetate were added thereto in this order, and the mixture was stirred at a bath temperature of 43° C. overnight. The next morning, the mixture was washed twice with 10 mL of water, and then dried over 20 g of sodium sulfate. Subsequently, the solution was filtered through a Kiriyama funnel and concentrated to dryness to obtain 0.51 g of a crude oxime as a mixture of an E form and a Z form (Z form is a compound represented by the following formula) (yield: 100%).

The resulting crude oxime was used in the following reaction without purification.

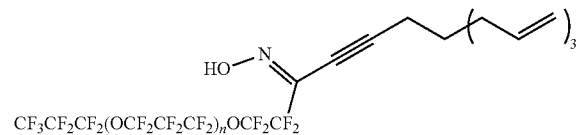

(n is 25)
¹H NMR (mXHF, 400 MHz) δ: 2.40-2.50 (m, 6H), 2.65 (s, 2H), 5.40-5.50 (m, 6H), 6.10-6.25 (m, 3H), 7.00 (s, 1H).

Synthetic Example 4-4

Synthesis of Cyclized Product

After dissolving 0.68 g (0.17 mmol) of the crude oxime obtained in Synthetic Example 4-3 in 3 mL of simply dehydrated AK 225 and 0.5 mL of super-dehydrated chloroform, 0.0052 g (0.017 mmol) of AuCl₃ was added thereto, and the mixture was stirred at room temperature overnight. The next morning, the mixture was washed with 10 mL of water, and then dried over 20 g of sodium sulfate. Subsequently, the solution was dissolved in 5 mL of mXHF, filtered through a Kiriyama funnel packed with silica gel in 3 cm, extracted with 60 mL of mXHF, and the filtrate was concentrated to dryness to obtain 0.41 g of a cyclized product represented by the following formula (yield: 60%).

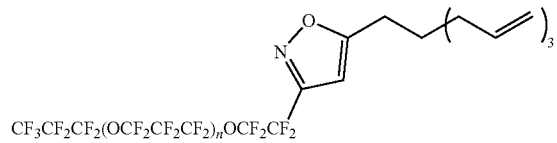

(n is 25)
¹H NMR (mXHF, 400 MHz) δ: 2.37-2.50 (m, 6H), 3.00 (s, 2H), 5.40-5.46 (m, 6H), 6.10-6.30 (m, 3H), 7.00 (s, 1H);
¹⁹F NMR (mXHF, 400 MHz) δ: −84.15--84.17, −85.00--86.00, −87.00, −88.55, −117.50--117.70, −131.27--131.98, −132.42.

Synthetic Example 4-5

Hydrosilylation of Cyclized Product

After dissolving 0.4 g (0.1 mmol) of cyclized product obtained in Synthetic Example 4-4 in 0.6 mL of simply dehydrated mXHF, 11 μl (0.5×10⁻³ mmol) of Karstedt catalyst and 3.6 μl (0.04 mmol) of aniline were added thereto in this order. After stirring at room temperature for 30 minutes, 0.102 mL (0.8 mmol) of trimethoxysilane was added and stirred at room temperature for 3 hours. After 3 hours, 0.6 mL of simply dehydrated HFE 7200 was added. To the reaction solution was added 0.076 g of activated carbon and stirred at room temperature for 30 minutes. After 30 minutes, filter filtration was performed, and the filtrate was concentrated to dryness to obtain 0.38 g of hydrosilyl isoxazole represented by the following formula (yield: 95%).

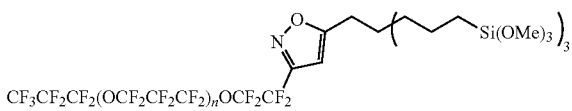

$CF_3CF_2CF_2(OCF_2CF_2CF_2)_nOCF_2CF_2$ (n is 25)

$^1$H NMR (mXHF, 400 MHz) δ: 0.98-1.08 (m, 6H), 1.60-1.77 (m, 6H), 1.91-1.95 (m, 6H), 2.96 (s, 2H), 3.90-4.10 (m, 27H), 7.21 (s, 1H);

$^{19}$F NMR (mXHF, 400 MHz) δ: −84.00, −85.00-−86.00, −88.52, −117.36, −131.40-−131.69, −132.42.

Preparation of Surface-Treating Agent

The surface-treating agent was prepared by dissolving the fluoropolyether group-containing silane compound obtained in Example 2 (That is, Synthetic Example 2-9) in hydrofluoroether (manufactured by 3M, Novec HFE-7200) so that the concentration of the fluoropolyether group-containing silane compound was 1% by mass.

Formation of Surface-Treating Layer

The surface-treating agent prepared above was vacuum-deposited on chemically tempered and surface-polished Gorilla Glass 3 (manufactured by Corning Incorporated) with a thickness of 0.5 mm, 71.5 mm×149.0 mm. Specifically, a resistance heating boat in the vacuum deposition system was filled with the surface-treating agent (0.05 g), and the vacuum deposition system was evacuated to a pressure of $3.0×10^{−3}$ Pa or lower. Next, a silicon dioxide film having a thickness of 5 nm was formed on Gorilla Glass 3, and the temperature of the resistance heating boat was raised to form a film on the chemically tempered glass. Next, the chemically tempered glass with a deposited film was left to stand in an atmosphere at a temperature of 150° C. for 30 minutes, and then allowed to cool to room temperature to form a surface-treating layer on the base material, thereby obtaining glass base materials with a surface-treating layer.

<Static Contact Angle>

Initial Evaluation

First, as an initial evaluation, after the surface-treating layer was formed, the static water contact angle of the surface with which nothing was brought into contact yet was measured.

(Friction Durability Test)

The sample article on which the surface-treating layer was formed was horizontally disposed, the following friction element was brought into contact with the surface-treating layer (the contact surface was a circle having a 1 cm diameter), a 5N load was applied thereon, and then the friction block was reciprocated at a speed of 40 mm/sec in a state in which the load was applied. The friction block was reciprocated up to 10,000 times, and the static contact angle (°) of water was measured every 1,000 times of reciprocation (friction frequency). The test was stopped when the measured value of the static contact angle of water was less than 80°. The results are shown in Table 1.

Friction Block

The surfaces (1 cm diameter) of the silicone rubber processed products shown below were covered with cotton soaked in artificial sweat having the compositional features shown below, and the products were used as friction blocks.

Compositional Feature of Artificial Sweat:
  Anhydrous disodium hydrogen phosphate: 2 g
  Sodium chloride: 20 g
  85% Lactic acid: 2 g
  Histidine hydrochloride: 5 g
  Distilled water: 1 kg
  Silicone rubber processed product:
  Silicone rubber stopper SR-51 made of Tiger's polymer processed into a cylindrical shape having a diameter of 1 cm and a thickness of 1 cm.

TABLE 1

|  | 0 times | 1,000 times | 2,000 times | 3,000 times | 4,000 times | 5,000 times | 6,000 times |
|---|---|---|---|---|---|---|---|
| Example 2 | 113 | 109 | 105 | 99 | 92 | 84 | 79 |

Industrial Applicability

The surface-treating agent of the present disclosure can be suitably utilized to form a surface-treating layer on the surface of a variety of base materials, in particular optical members for which transparency is required.

What is claimed is:

1. A fluoropolyether group-containing silane compound of the formula (Ia) or the formula (Ib):

$$R^{F1}—X^A—R^{Si} \quad (1a)$$

$$R^{Si}—X^A—R^{F2}—X^A—R^{Si} \quad (1b)$$

wherein
  $R^{F1}$ is each independently at each occurrence $Rf^1—R^F—O_q—$;
  $R^{F2}$ is $—Rf^2_p—R^F—O_g—$;
  $Rf^1$ is each independently at each occurrence a $C_{1-16}$ alkyl group optionally substituted with one or more fluorine atoms;
  $Rf^2$ is a $C_{1-6}$ alkylene group optionally substituted with one or more fluorine atoms;
  $R^F$ is each independently at each occurrence a divalent fluoropolyether group;
  p is 0 or 1;
  q is each independently at each occurrence 0 or 1;
  $X^A$ is each independently at each occurrence $—X^1_{r1}—W—X^2_{r2}—$;
  $X^1$ is a divalent organic group;
  W is a 5-membered heterocyclic ring having two or more heteroatoms;
    at least one of the heteroatoms is a N atom;
  $X^2$ is a divalent organic group;
  r1 is 0 or 1;
  r2 is 0 or 1;
  $R^{Si}$ is each independently at each occurrence represented by the formula (S1):

$$-A^1(Z^1—Si R^{11}_n R^{12}_{3-n})_m R^e_{3-m} \quad (S1)$$

$A^1$ is C or Si;
  $Z^1$ is each independently at each occurrence a divalent organic group;
  $R^{11}$ is each independently at each occurrence a hydroxyl group or a hydrolyzable group;

$R^{12}$ is each independently at each occurrence a hydrogen atom or a monovalent organic group;

n is each independently at each occurrence an integer of 1 to 3;

$R^e$ is each independently at each occurrence a hydrogen atom, a hydroxyl group, or a monovalent organic group; and m is each independently at each occurrence 2 or 3.

2. The fluoropolyether group-containing silane compound according to claim 1, wherein $R^F$ is each independently at each occurrence a group represented by the formula:

$$-(OC_6F_{12})_a-(OC_5F_{10})_b-(OC_4F_8)_c-(OC_3F_6)_d-(OC_2F_4)_e-(OCF_2)_f-$$

wherein a, b, c, d, e and f are each independently an integer of 0 to 200, the sum of a, b, c, d, e and f is 1 or more, and the occurrence order of the respective repeating units enclosed in parentheses provided with a, b, c, d, e or f is not limited in the formula.

3. The fluoropolyether group-containing silane compound according to claim 1, wherein $R^F$ is each independently at each occurrence represented by the following formula (f1), (f2), (f3), (f4), or (f5):

$$-(OC_3F_6)_d- \qquad (f1)$$

wherein d is an integer of 1 to 200;

$$-(OC_4F_8)_c-(OC_3F_6)_d-(OC_2F_4)_e-(OCF_2)_f- \qquad (f2)$$

wherein c and d are each independently an integer of 0 or more and 30 or less, e and f are each independently an integer of 1 or more and 200 or less;

the sum of c, d, e, and f is 2 or more; and the occurrence order of the respective repeating units enclosed in parentheses provided with a subscript c, d, e, or f is not limited in the formula;

$$-(R^6-R^7)_g- \qquad (f3)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or a combination of two or three groups independently selected from these groups; and g is an integer of 2 to 100;

$$-(OC_6F_{12})_a-(OC_5F_{10})_b-(OC_4F_8)_c-(OC_3F_6)_d-(OC_2F_4)_e-(OCF_2)_f- \qquad (f4)$$

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; and $$-(OC_6F_{12})_a-(OC_5F_{10})_b-(OC_4F_8)_c-(OC_3F_6)_d-(OC_2F_4)_e-(OCF_2)_f- \qquad (f5)$$

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

4. The fluoropolyether group-containing silane compound according to claim 1, wherein the two or more heteroatoms are two or more N atoms.

5. The fluoropolyether group-containing silane compound according to claim 1, wherein the two or more heteroatoms are at least one N atom and at least one heteroatom other than N atom.

6. The fluoropolyether group-containing silane compound according to claim 5, wherein the at least one heteroatom other than N atom is O atom.

7. The fluoropolyether group-containing silane compound according to claim 1, wherein $X^1$ and $X^2$ are each independently at each occurrence a divalent organic group represented by $-(R^{51})_{p5}-(X^{51})_{q5}-$:

wherein $R^{51}$ represents $-(CH_2)_{s5}-$;

s5 is an integer of 1 to 20;

$X^{51}$ represents $-(X^{52})_{l5}-$;

$X^{52}$ each independently at each occurrence represents a group selected from the group consisting of $-O-$, $-C(O)O-$, $-CONR^{54}-$, $-O-CONR^{54}-$, and $-NR^{54}-$;

$R^{54}$ each independently at each occurrence represents a hydrogen atom, a phenyl group, or a $C_{1-6}$ alkyl group;

l5 is an integer of 1 to 10;

p5 is 0 or 1; and q5 is 0 or 1, provided that the occurrence order of respective repeating units enclosed in parentheses provided with p5 or q5 is not limited.

8. The fluoropolyether group-containing silane compound according to claim 1, wherein $X^1$ and $X^2$ are each independently at each occurrence a $C_{1-20}$ alkylene group.

9. The fluoropolyether group-containing silane compound according to claim 1, wherein r1 is 0 and r2 is 1.

10. The fluoropolyether group-containing silane compound according to claim 1, wherein r1 is 0, r2 is 1, $X^2$ is $-(CH_2)_{s5}-$, and s5 is an integer of 1 to 3.

11. The fluoropolyether group-containing silane compound according to claim 1, wherein $Z^1$ is a $C_{1-6}$ alkylene group, $-(CH_2)_{z1}-O-(CH_2)_{z2}$, or $-(CH_2)_{z3}$-phenylene-$(CH_2)_{z4}-$, wherein z1 to z4 are each independently an integer of 0 to 6.

12. The fluoropolyether group-containing silane compound according to claim 1, wherein m is 3.

13. The fluoropolyether group-containing silane compound according to claim 1, wherein n is 3.

* * * * *